US011676253B2

(12) United States Patent
Ponto et al.

(10) Patent No.: US 11,676,253 B2
(45) Date of Patent: Jun. 13, 2023

(54) SYSTEMS, METHODS, AND MEDIA FOR HIERARCHICAL PROGRESSIVE POINT CLOUD RENDERING

(71) Applicant: Wisconsin Alumni Research Foundation, Madison, WI (US)

(72) Inventors: Kevin Ponto, Madison, WI (US); Ross D. Tredinnick, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 370 days.

(21) Appl. No.: 17/020,371

(22) Filed: Sep. 14, 2020

(65) Prior Publication Data

US 2021/0209738 A1     Jul. 8, 2021

Related U.S. Application Data

(63) Continuation of application No. 15/996,096, filed on Jun. 1, 2018, now Pat. No. 10,803,561.

(Continued)

(51) Int. Cl.
*G06T 5/00*     (2006.01)
*G06T 15/00*     (2011.01)
(Continued)

(52) U.S. Cl.
CPC .............. *G06T 5/007* (2013.01); *G06T 15/00* (2013.01); *G06T 15/005* (2013.01); *G06T 15/04* (2013.01);
(Continued)

(58) Field of Classification Search
None
See application file for complete search history.

(56) References Cited

U.S. PATENT DOCUMENTS

| 5,006,721 A | 4/1991 | Cameron |
| 10,521,952 B2 | 12/2019 | Ackerson |

(Continued)

OTHER PUBLICATIONS

Botsch, M., et al., "High-quality surface splatting on today's gpus," in Point-Based Graphics, 2005. Eurographics/IEEE VGTC Symposium Proceedings, Jun. 2005, pp. 17-141.

(Continued)

*Primary Examiner* — Nurun Flora
(74) *Attorney, Agent, or Firm* — Quarles & Brady LLP

(57) ABSTRACT

In accordance with some aspects, systems, methods and media for hierarchical progressive point cloud rendering are provided. In some aspects, a method for point cloud rendering is provided, the method comprising: rendering a first image based on point cloud data; requesting point cloud points, first synthetic point cloud points, and an octant of a second synthetic point cloud that intersects a new viewing frustum; reprojecting points used during rendering of the first image into frame buffer objects (FBOs) of different resolutions; replacing reprojected points if a received point corresponding to the same pixel is closer to the camera; determining that a pixel in the highest resolution FBO is unfilled; copying a point that originated in a lower resolution FBO to the gap in the highest resolution FBO; and when the highest resolution FBO is filled, rendering a second image based on the contents.

19 Claims, 18 Drawing Sheets

Related U.S. Application Data

(60) Provisional application No. 62/514,706, filed on Jun. 2, 2017.

(51) Int. Cl.
  G06T 15/04 (2011.01)
  G06T 17/00 (2006.01)

(52) U.S. Cl.
  CPC .. G06T 17/005 (2013.01); *G06T 2207/10028* (2013.01); *G06T 2210/56* (2013.01)

(56) References Cited

U.S. PATENT DOCUMENTS

| | | | | |
|---|---|---|---|---|
| 2015/0373153 | A1* | 12/2015 | Jenkins | G06T 19/003 709/203 |
| 2017/0039765 | A1* | 2/2017 | Zhou | G06T 7/521 |
| 2019/0318528 | A1* | 10/2019 | Hunt | G06T 15/08 |
| 2019/0371051 | A1* | 12/2019 | Dore | G06T 7/50 |
| 2020/0020155 | A1* | 1/2020 | Duka | G06T 7/596 |
| 2020/0387739 | A1* | 12/2020 | Williams | G06F 18/214 |

OTHER PUBLICATIONS

Brennan, P.F., et al., "Virtualizing living and working spaces: Proof of concept for a biomedical space-replication methodology," Journal of biomedical informatics, vol. 57, pp. 53-61, 2015.

Buck, Ian, et al., Gpu gems 2: programming techniques for high-performance graphics and general-purpose computation. Chapter 32. Edited by Matt Pharr, published by Addison-Wesley Professional, 2005.

Cobb, S. V., et al., "Virtual reality induced symptoms and effects (vrise)," Presence, vol. 8, No. 2, pp. 169-186, 1999.

Coleman, E.A., et al., "The care transitions intervention: results of a randomized controlled trial," Archives of internal medicine, vol. 166, No. 17, pp. 1822-1828, 2006.

Cruz-Neira, C., et al., "Surround-screen projection-based virtual reality: the design and implementation of the cave," in Proceedings of the 20th annual conference on Computer graphics and interactive techniques. ACM, 1993, pp. 135-142.

Dachsbacher, C., et al., "Sequential point trees," in ACM Transactions on Graphics (TOG), vol. 22, No. 3. ACM, 2003, pp. 657-662.

Elseberg, J., et al., "One billion points in the cloud—an octree for efficient processing of 3d laser scans," ISPRS Journal of Photogrammetry and Remote Sensing, vol. 76, pp. 76-88, 2013.

Gobbetti, E., et al., "Layered point clouds: a simple and efficient multi resolution structure for distributing and rendering gigantic pointsampled models," vol. 28, Issue 6 of Computers and Graphics, pp. 815-826, in Dec. 2004.

Goswami, P., et al., "An efficient multi-resolution framework for high quality interactive rendering of massive point clouds using multi-way kd-trees," The Visual Computer, vol. 29, No. 1, pp. 69-83, 2012.

Gross M., et al., eds, Point-based graphics. Published by Morgan Kaufmann, 2011.

Hart S. G., et al, "Development of nasa-tlx (task load index): Results of empirical and theoretical research," Advances in psychology, vol. 52, pp. 139-183, 1988.

Hill A.-M., et al., "Falls after discharge from hospital: is there a gap between older peoples knowledge about falls prevention strategies and the research evidence?" The Gerontologist, vol. 51, No. 5, pp. 653-662, 2011.

Hore, A., et al., "Image quality metrics: Psnr vs. ssim," in Pattern Recognition (ICPR), 2010 20th International Conference on, Aug. 2010, pp. 2366-2369.

Kreylos, O., et al., "Immersive visualization and analysis of lidar data," in Advances in visual computing. Springer, 2008, pp. 846-855.

Lerma, J.L., et al., "Terrestrial laser scanning and close range photogrammetry for 3d archaeological documentation: the upper palaeolithic cave of parpall'o as a case study," Journal of Archaeological Science, vol. 37, No. 3, pp. 499-507, 2010.

Marroquim, R., et al., "Efficient point-based rendering using image reconstruction," in Proceedings Symposium on Point-Based Graphics, 2007, pp. 101-108.

McMahan, R.P., et al., "Evaluating display fidelity and interaction fidelity in a virtual reality game," Visualization and Computer Graphics, IEEE Transactions on, vol. 18, No. 4, pp. 626-633, 2012.

Ponto, K., et al., "Simulating the experience of home environments." 2017 International Conference on Virtual Rehabilitation (ICVR). IEEE, 2017.

Ponto, K., et al., HPPR: Hierarchical Progressive Point Cloud Rendering, Journal of Latex Class Files, vol. 14 No. 8, Aug. 2015.

Preiner, R., et al., "Auto splats: Dynamic point cloud visualization on the gpu," in Proceedings of Eurographics Symposium on Parallel Graphics and Visualization, H. Childs and T. Kuhlen, Eds. Eurographics Association 2012, May 2012, pp. 139-148.

Richter, R., et al., "Out-of-core real-time visualization of massive 3d point clouds," in Proceedings of the 7th International Conference on Computer Graphics, Virtual Reality, Visualisation and Interaction in Africa. ACM, 2010, pp. 121-128.

Rodriguez, M.B., et al., "Interactive Exploration of Gigantic Point Clouds on Mobile Devices," in VAST: International Symposium on Virtual Reality, Archaeology and Intelligent Cultural Heritage, D. Arnold, J. Kaminski, F. Niccolucci, and A. Stork, Eds. The Eurographics Association, 2012.

Rosser, N., et al., "Terrestrial laser scanning for monitoring the process of hard rock coastal cliff erosion," Quarterly Journal of Engineering Geology and Hydrogeology, vol. 38, No. 4, pp. 363-375, 2005.

Rusinkiewicz, S., et al., "Qsplat: A multiresolution point rendering system for large meshes," in Proceedings of the 27th annual conference on Computer graphics and interactive techniques. ACM Press/Addison-Wesley Publishing Co., 2000, pp. 343-352.

Ruther, H., et al., "Laser scanning for conservation and research of african cultural heritage sites: the case study of wonderwerk cave, south africa," Journal of Archaeological Science, vol. 36, No. 9, pp. 1847-1856, 2009.

Scheiblauer, C., et al., "Out-of-core selection and editing of huge point clouds," Computers & Graphics, vol. 35, No. 2, pp. 342-351, 2011.

Slater, M., "A note on presence terminology," Presence connect, vol. 3, No. 3, pp. 1-5, 2003.

Smit, F., et al., "An image-warping architecture for vr: Low latency versus image quality," in Virtual Reality Conference, 2009. VR 2009. IEEE, Mar. 2009, pp. 27-34.

Subramaniam, N.A., et al., "Hierarchical plane extraction (hpe): an efficient method for extraction of planes from large point cloud datasets," in Proceedings of the 34th Annual Conference of the Association for Computer Aided Design in Architecture on, ACADIA, 2014, pp. 627-636.

Tredinnick, R., et al, "Experiencing interior environments: New approaches for the immersive display of large-scale point cloud data," in Virtual Reality (VR), 2015 IEEE, Mar. 2015, pp. 297-298.

Tredinnick, R., et al., "Progressive feedback point cloud rendering for virtual reality display," in Virtual Reality (VR), 2016 IEEE. IEEE, 2016, pp. 301-302.

Walter, B et al. Interactive Rendering using the Render Cache. D. Lischinski and G.W. Larson. Rendering techniques '99 (Proceedings of the 10th Eurographics Workshop on Rendering), Jun. 1999, Granada, Spain. Springer-Verlag/Wien, 10, pp. 235-246, 1999.

Wand, M., et al., "Processing and interactive editing of huge point clouds from 3d scanners," Computers & Graphics, vol. 32, No. 2, pp. 204-220, 2008.

Wang, J., et al., "Research on 3d laser scanning technology based on point cloud data acquisition," in Audio, Language and Image Processing (ICALIP), 2014 International Conference on, Jul. 2014, pp. 631-634.

Wimmer M., et al., "Instant points: Fast rendering of unprocessed point clouds," in Proceedings of the 3rd Eurographics/IEEE VGTC conference on Point-Based Graphics. Eurographics Association, 2006, pp. 129-137.

(56) References Cited

OTHER PUBLICATIONS

Winkler, S., et al., "The evolution of video quality measurement: from psnr to hybrid metrics," Broadcasting, IEEE Transactions on, vol. 54, No. 3, pp. 660-668, 2008.

* cited by examiner

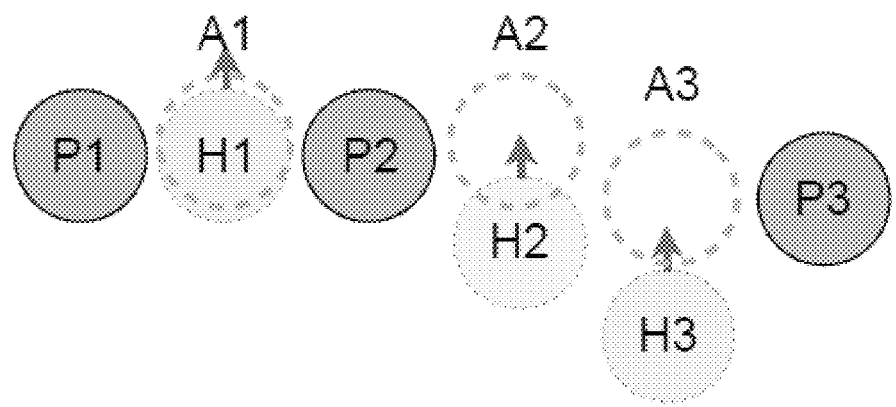
FIG. 4

Subdivide Point Cloud into Voxels.

Determine Average Color of
Points in Each Voxel

Disregard Original Points,
Retain Average Color
Information

Address: Level 0 (X,Y,Z)

Use Average Color Information to Generate a Synthetic Point Cloud with Points at the Center of Voxels Subdivide the Point Cloud into Octants.

(0,0,0,0)     (1,0,0,0)

Address: Level 1(I,X,Y,Z)

Sub-divide Each Octant into Voxels.

(0,0,0,0)  (1,0,0,0)  (2,0,0,0)  (3,0,0,0)

Address: Level 2 (I,X,Y,Z)

Sub-divide Each Octant into Octants
(i.e., Original Point Cloud is sub-divided
into 64 Smaller Volumes)

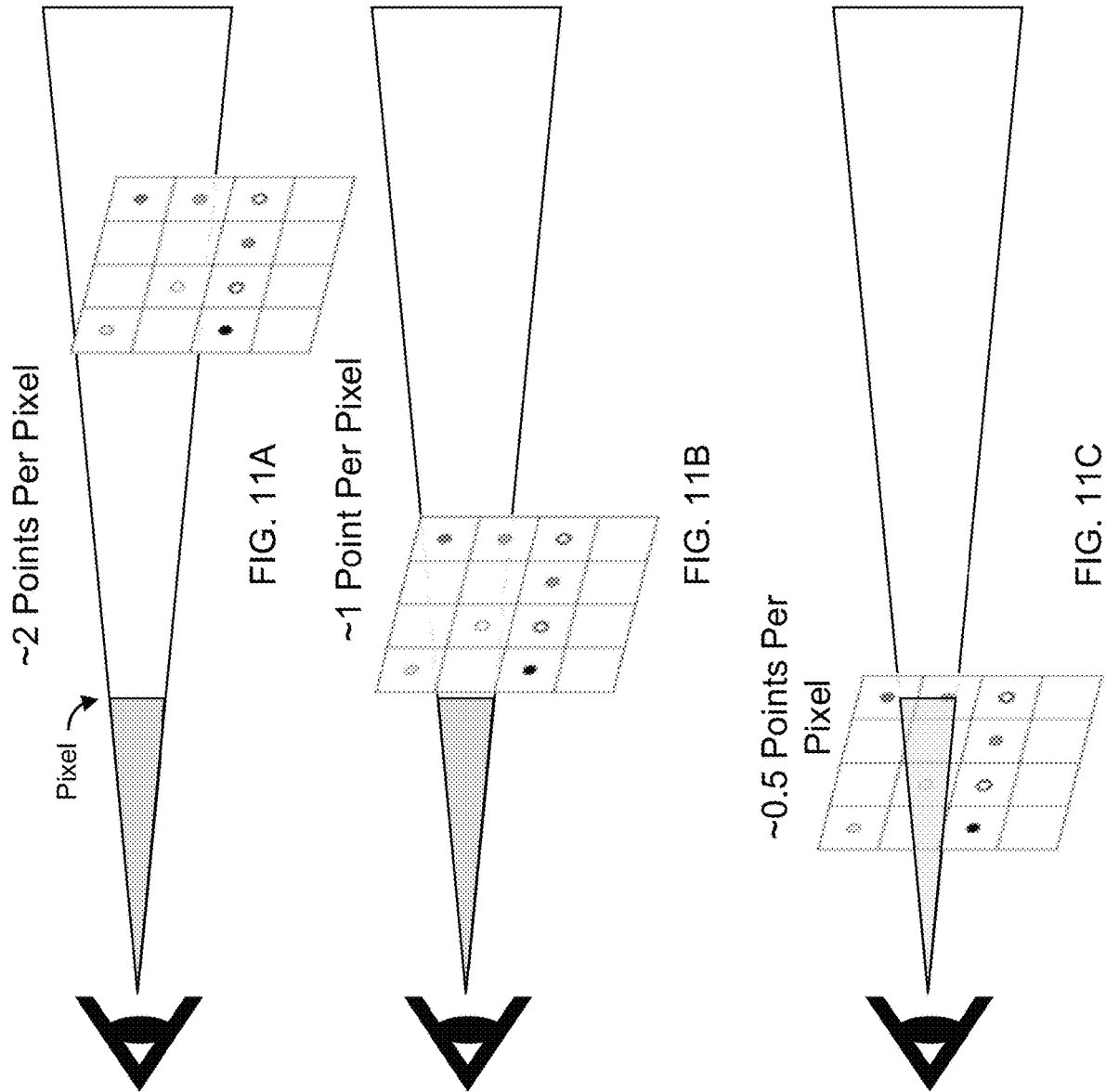

SYSTEMS, METHODS, AND MEDIA FOR HIERARCHICAL PROGRESSIVE POINT CLOUD RENDERING

CROSS-REFERENCE TO RELATED APPLICATIONS

This application is a continuation of U.S. patent application Ser. No. 15/996,096, filed Jun. 1, 2018, and issuing as U.S. Pat. No. 10,803,561 on Oct. 13, 2020, which is based on, claims the benefit of, and claims priority to U.S. Provisional Application No. 62/514,706, filed Jun. 2, 2017, both of which are hereby incorporated herein by reference in their entirety for all purposes.

STATEMENT REGARDING FEDERALLY SPONSORED RESEARCH

This invention was made with government support under 2016-IJ-CX-0017 awarded by the U.S. Department of Justice and under HS033659 awarded by the Agency for Healthcare Research and Quality. The government has certain rights in the invention.

BACKGROUND

Point cloud data created (e.g., using lidar techniques, which is sometimes referred to as LIDAR, LiDAR, or LADAR) that preserves the positions of objects within a scene or scenes in great detail. For example, point cloud data can be used to represent the contents of a room, a building, a crime scene, a landmark, a land formation, etc., in detail such a replica of the scene can be reproduced. Such point cloud representations may be useful for a variety of applications, such as studying details of a crime scene without blocking off the area for an extended period of time (e.g., days or weeks), for preserving sites of cultural importance (e.g., buildings, landmarks, etc.) that may otherwise be lost due to neglect, erosion, etc. As another example, point cloud data can be used to recreate the details of a patient's dwelling prior to discharge from a medical facility, such that a medical practitioner (e.g., a doctor, a physical therapist, etc.) can inspect the dwelling to determine whether any modifications should be made before the patient returns home.

While technology for creating highly detailed point cloud data that can include millions to billions of individual points is available, rendering the point cloud data can be extremely difficult in light of the potential for extremely large datasets. For example, to create a single 1920 by 1080 pixel image (e.g., an HD image) from a point cloud including just one billion points, a system must select up to about two million points from the billion available points in order to render the single image. In many virtual reality applications frame rates in the range of 70 to 120 frames per second (fps) are often required to avoid causing users discomfort. Extending the above example, to render HD quality images at 70 fps may require sifting through several dozen million points each fraction of a second (e.g., in about 14.3 milliseconds) between frames to determine which points to render, and which to ignore or discard.

One conventional technique for attempting to render point cloud data more efficiently is to organize the point cloud data in a multi-level octree that is organized based on location within the scene. The information from the octree can be used in combination with information about the field of view into the scene to relatively efficiently disregard large portions of the point cloud data that are not within the field of view. However, while this can reduce the number of points that to be considered, there are still potentially many millions of points that are within the field of view. Another conventional technique for attempting to render point cloud data more efficiently is to reduce the resolution of the image being rendered by using a single point to render multiple pixels. While this can increase frame rates at which point cloud data can be rendered, this also creates lower quality images.

Using conventional techniques to attempt to render point cloud data can result in low resolution images, low frame rates, partially transparent objects (e.g., where an object between the camera and another object is only partially rendered), blank spaces where no points are rendered, and other artifacts that can reduce the usability of the point cloud data.

Accordingly, new systems, methods, and media, for hierarchical progressive point cloud rendering are desirable.

SUMMARY

In accordance with some aspects of the disclosed subject matter, systems, methods, and media for hierarchical progressive point cloud rendering are provided.

In accordance with some embodiments of the disclosed subject matter, a method for point cloud rendering is provided, the method comprising: rendering a first image based at least in part on point cloud data, the first image corresponding to a first viewing frustum; determining that a viewing angle has changed to a second viewing frustum; requesting, from a memory, points from a first synthetic point cloud that are within the second viewing frustum, wherein the first synthetic point cloud has a resolution that is lower than a resolution of the point cloud data; requesting points in a subdivision of a second synthetic point cloud that intersects the second viewing frustum, wherein the second synthetic point cloud has a resolution that is lower than a resolution of the point cloud data and higher than a resolution of the first synthetic point cloud; reprojecting points used during rendering of the first image into a plurality of frame buffer objects of different resolutions including at least a first frame buffer object of a first resolution for points from the first synthetic point cloud, and a second frame buffer object of a second resolution for points from the second synthetic point cloud, wherein the second resolution is higher than the first resolution; determining, for each frame buffer object, whether at least one point received from the memory corresponds to the same position in the frame buffer object as a point reprojected into the frame buffer object; overwriting, in each frame buffer object, at least one reprojected point with a point corresponding to the same position received from the memory that is closer to a camera position; determining that a first position in the first frame buffer object is not associated with a reprojected point and is not associated with a point received from the memory after rendering of the first image; in response to determining that the first position in the first frame buffer object is not associated with a reprojected point and not associated with a new point, copying a point that originated in a lower resolution frame buffer object to the first position of the first frame buffer object; determining that the first frame buffer object is filled; and in response to determining that the first frame buffer object is filled, rendering a second image based on the contents of the first frame buffer object.

In some embodiments, the method further comprises: determining that a plurality of subdivisions of the second synthetic point cloud intersect the second viewing frustum; and selecting the subdivision from the plurality of subdivisions based on a distance to the subdivision.

In some embodiments, each of a plurality of points from the first synthetic point cloud represents a subset of one or more points from the point cloud data, and a color associated with each of the plurality of points is corresponds to an average color of points in the subset of one or more points from the point cloud data represented by that point from the synthetic point cloud.

In accordance with some embodiments of the disclosed subject matter, a system for point cloud rendering is provided, the system comprising: memory storing: a first synthetic point cloud representing a three dimensional scene, the first synthetic point cloud organized as a grid of first voxels, each point of the first synthetic point cloud representing one or more points in point cloud data having a non-homogenous point density; a second synthetic point cloud representing the scene, the second synthetic cloud subdivided into a plurality of octants that is each organized as a grid of second voxels, wherein the first voxels each represent a portion of the scene, and the second voxels each represent a smaller portion of the scene; a central processing unit associated with cache memory; and a graphic processing unit, wherein the graphics processing unit is programmed to: render a first image of the scene corresponding to a first viewpoint of a virtual camera; determine that an image from a second viewpoint is to be rendered, the second viewpoint associated with a second viewing frustum; determine that a first octant of the plurality of octants intersects the second viewing frustum; receive a plurality of points included in the first octant from the cache memory; replace a point at a first position in the first frame buffer object with a first point of the plurality of points that represents the same pixel and that is closer to a position of the virtual camera; determine that a gap exists in the first frame buffer object at a second position; fill the second position in the first frame buffer object using a second point at a corresponding position in a second frame buffer object storing a plurality of points from the first synthetic point cloud; determine that a first gap exists in a third frame buffer object storing a plurality of points from a third synthetic point cloud at the first position, and that a second gap exists in the third frame buffer object at a second position; fill the first gap using the first point; fill the second gap using the second point; render a second image corresponding to the second viewing frustum based on points stored in the third frame buffer object, including the first point and the second point.

In some embodiments, the graphics processing unit is further programmed to: determine that a second octant of the plurality of octants intersects the second viewing frustum; select the first octant based on a distance to the first octant; request points in the first octant from the cache memory; and receive the plurality of points responsive to the request.

In some embodiments, the second point represents a first cell in the first synthetic point cloud, and a color of the second point is an average calculated based on the color of each of a plurality of points from the point cloud data that are at least partially within the portion of the scene represented by the first cell.

In some embodiments, the color of the second point is based on a simple average of the plurality of points from the point cloud data.

In some embodiments, a position of the second point is a midpoint of the first cell.

In some embodiments, the memory further stores: the third synthetic point cloud representing the scene, the third synthetic cloud subdivided into the plurality of octants, each of the plurality of octants subdivided into eight sub-octants that are each organized as a grid of third voxels, wherein the third voxels each represent a smaller portion of the scene than the second voxels.

In some embodiments, the first synthetic point cloud is subdivided into n voxels along a first axis of the scene, where n is less than or equal to 256, and the first octant is subdivided into n voxels along the first axis.

In some embodiments, a position of each point of the first synthetic point cloud within the first synthetic point cloud is represented by no more than three bytes.

In some embodiments, a position of each point of the second synthetic point cloud within an octant of the plurality of octants is represented using no more than three bytes.

In some embodiments, a method for point cloud rendering is provided, the method comprising: storing, in memory, a first synthetic point cloud representing the scene, the first synthetic point cloud organized as a grid of first voxels; storing, in memory, a second synthetic point cloud representing the scene, the second synthetic cloud subdivided into a plurality of octants that are each organized as a grid of second voxels, wherein the first voxels each represent a portion of the scene, and the second voxels each represent a smaller portion of the scene; rendering, using a graphics processing unit, a first image of the scene corresponding to a first viewpoint of a virtual camera; determining that an image from a second viewpoint is to be rendered, the second viewpoint associated with a second viewing frustum; determining that a first octant of the plurality of octants intersects the second viewing frustum; receiving a plurality of points included in the first octant from a cache memory of a central processing unit coupled to the GPU; replacing a point at a first position in the first frame buffer object with a first point of the plurality of points that represents the same pixel and that is closer to a position of the virtual camera; determining that a gap exists in the first frame buffer object at a second position; filling the second position in the first frame buffer object using a second point at a corresponding position in a second frame buffer object storing a plurality of points from the first synthetic point cloud; determining that a first gap exists in a third frame buffer object storing a plurality of points from a third synthetic point cloud at the first position, and that a second gap exists in the third frame buffer object at a second position; filling the first gap using the first point; filling the second gap using the second point; rendering a second image corresponding to the second viewing frustum based on points stored in the third frame buffer object, including the first point and the second point.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 4 shows an example of real points and inferred points generated by linear interpolation between neighboring points in accordance with some aspects of the disclosed subject matter.

FIGS. 11A to 11C show examples of the same octant at different distances corresponding to different points per pixel in accordance with some aspects of the disclosed subject matter.

DETAILED DESCRIPTION

The present disclosure provides system and methods which can, for example, include systems, methods, and media, for hierarchical progressive point cloud rendering.

In accordance with some aspects of the disclosed subject matter, the mechanisms described herein can render images of a scene from point cloud data by reusing points that were used to render a previous frame, and can replace a portion of the reused points with new points and/or supplement the reused points with new points when the view of the scene changes and/or when a new image of the same view is to be rendered.

In some aspects, the mechanisms described herein can select subsets of points from representations of the point cloud at various resolutions that are associated with a portion of the scene that intersects a viewing frustum corresponding to a current view of the scene. For example, the mechanisms described herein can select points from nodes at various levels of an octree that represent a portion of the scene that intersects the viewing frustum. In such an example, the newly selected points can be used to replace points in a frame buffer object corresponding to a level of the octree from which a point originated, and points in lower resolution frame buffers can be used to supplement higher resolution frame buffers where a point from a higher resolution level of the octree is not present.

As another example, the mechanisms described herein can select points from various representations of the point cloud data at different resolutions. In such an example, the newly selected points can be used to replace points in a frame buffer object corresponding to a representation of the point cloud from which a point originated, and points in lower resolution frame buffers can be used to supplement higher resolution frame buffers where a point from a higher resolution representation of the point cloud is not present.

In accordance with some aspects of the disclosed subject matter, using the mechanisms described herein can improve the functioning of a computing device rendering images of a scene represented by point cloud data. For example, in some aspects, using the mechanisms described herein can facilitate rendering of point cloud data of a scene that includes billions of individual points at relatively high frame rates. In a more particular example, using the mechanisms described herein can render images of detailed portions of a point cloud at upward of 70 fps (e.g., in the range of 70-120 fps) while the viewpoint is moving between frames. As another example, in some aspects, using the mechanisms described herein can reduce highly noticeable visual errors when rendering images based on point cloud data, such as solid objects appearing to be partially transparent, the appearance of blank spots at the edges of images when the viewpoint changes, etc.

Figure 1:
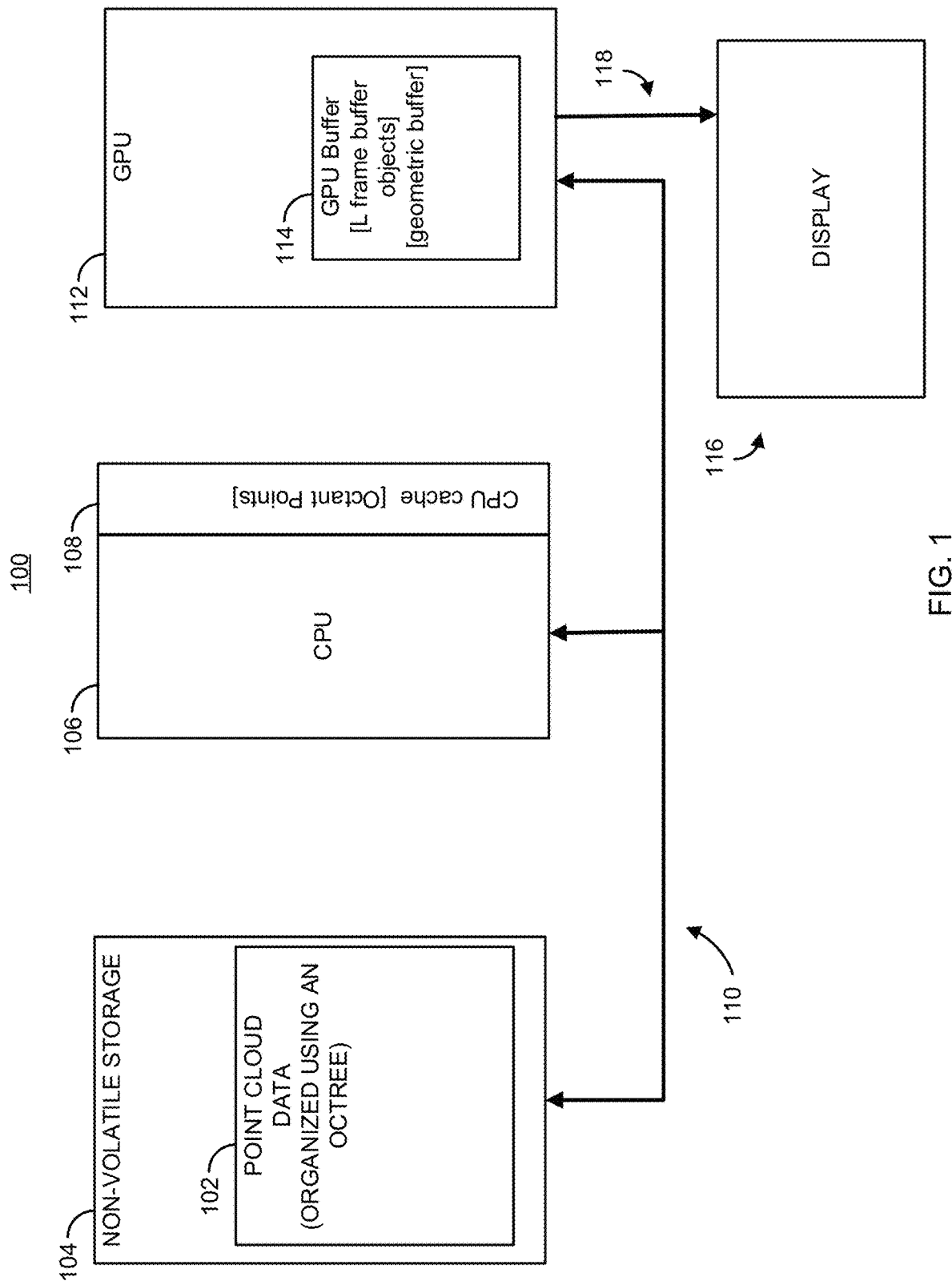
FIG. 1 shows an example of a system for hierarchical progressive point cloud rendering in accordance with some aspects of the disclosed subject matter.

FIG. 1 shows an example 100 of a system for hierarchical progressive point cloud rendering in accordance with some aspects of the disclosed subject matter. As shown in FIG. 1, point cloud data 102 representing one or more scenes can be stored using non-volatile storage 104, such as a hard drive, a solid state drive, flash, etc. Additionally or alternatively, in some aspects, point cloud data 102 can be held in volatile memory (e.g., RAM) that has sufficient capacity to store a large file such as point cloud 102. In some aspects, point cloud data 102 can include any suitable number of points of data that collectively represent the state of one or more scenes. Such a point cloud can be generated from one or more LiDAR scans, which can generate very large datasets that can depict, for example, the interior and/or exterior of a home, a crime scene, a historical site, etc. In some cases, point cloud data 102 can include billions of points, and may not have uniform point density. For example, portions of a scene with more detail can be captured at higher point density to make sure that the detail is represented in the point cloud data. Accordingly, point cloud data 102 can include tens of gigabytes of data. In a more particular example, a LiDAR-scanned data set of Frank Lloyd-Wright's 'Taliesin' home and office can include both exterior and interior spaces, intricate details and complex shading features. In such an example, the point cloud can include more than $1.9 \times 10^9$ points requiring about 30 Gigabytes of storage, which is beyond the capabilities of currently available graphics cards. The Taliesin data set can contain varying point density. For example, 80 LiDAR scans could be used to make up the full model, and preprocessing of the data set may not include homogenization of point density to preserve high detail of certain objects in the space (a desire common for interior spaces).

In some aspects, point cloud data 102 can be organized using an octree (e.g., as described below in connection with FIG. 2). Such an octree structure can organize points in point cloud data 102 based on which region of the scene the point is located in, which can later be used to determine which groups of points (e.g., nodes in the octree) are potentially within the viewport(s) of the virtual camera(s) representing the viewpoint(s) of a user (or users).

In some aspects, system 100 can include a central processing unit (CPU) 106 with cache memory 108. In some aspects, CPU 106 can access information in cache memory 108 without using a bus 110 over which CPU 106 communicates with other hardware, such as non-volatile storage 104, main memory (e.g., RAM) (not shown), a GPU 112, etc. In some aspects, CPU 106 can coordinate operation of at least a portion of system 100, such as by executing an operating system, accessing main memory and/or non-volatile storage 104, etc.

In some aspects, system 100 can include a graphics processing unit (GPU) 112 that can be configured to render graphics to be presented by a display 116. In some aspects, GPU 112 can include buffer memory 114 that can be used, for example, to temporarily store data that can be manipulated by GPU 112 to render graphics that are to be presented to a user using display 116. Display 116 can be any suitable type of display or combination of displays. For example, display 116 can be one or more projectors, flat panel displays, etc., that is part of an immersive virtual reality environment, such as a cave automatic virtual environment (CAVE). As another example, display 116 can be one or more presentation devices (e.g., an LCD display, an OLED display, an AMOLED display, etc.) integrated into a head mounted display (HMD) that can provide a virtual reality and/or augmented reality experience to a user. As yet another example, display 116 can be a television, compute monitor, touchscreen, etc.

In some aspects, GPU 112 can output image data to display 116 over a connection 118. In some aspects, connection 118 can be any suitable connection that can communicate image data from GPU 112 to display 116. For example, connection 118 can be an internal bus connecting GPU 112 to an internal display (e.g., where display 116 is part of a head mounted display, smartphone, tablet computer, etc.). As another example, connection 118 can be a connection to an external display using a cable (e.g., HDMI, Display Port, DVI, etc.), a wireless link, etc.

Figure 2:
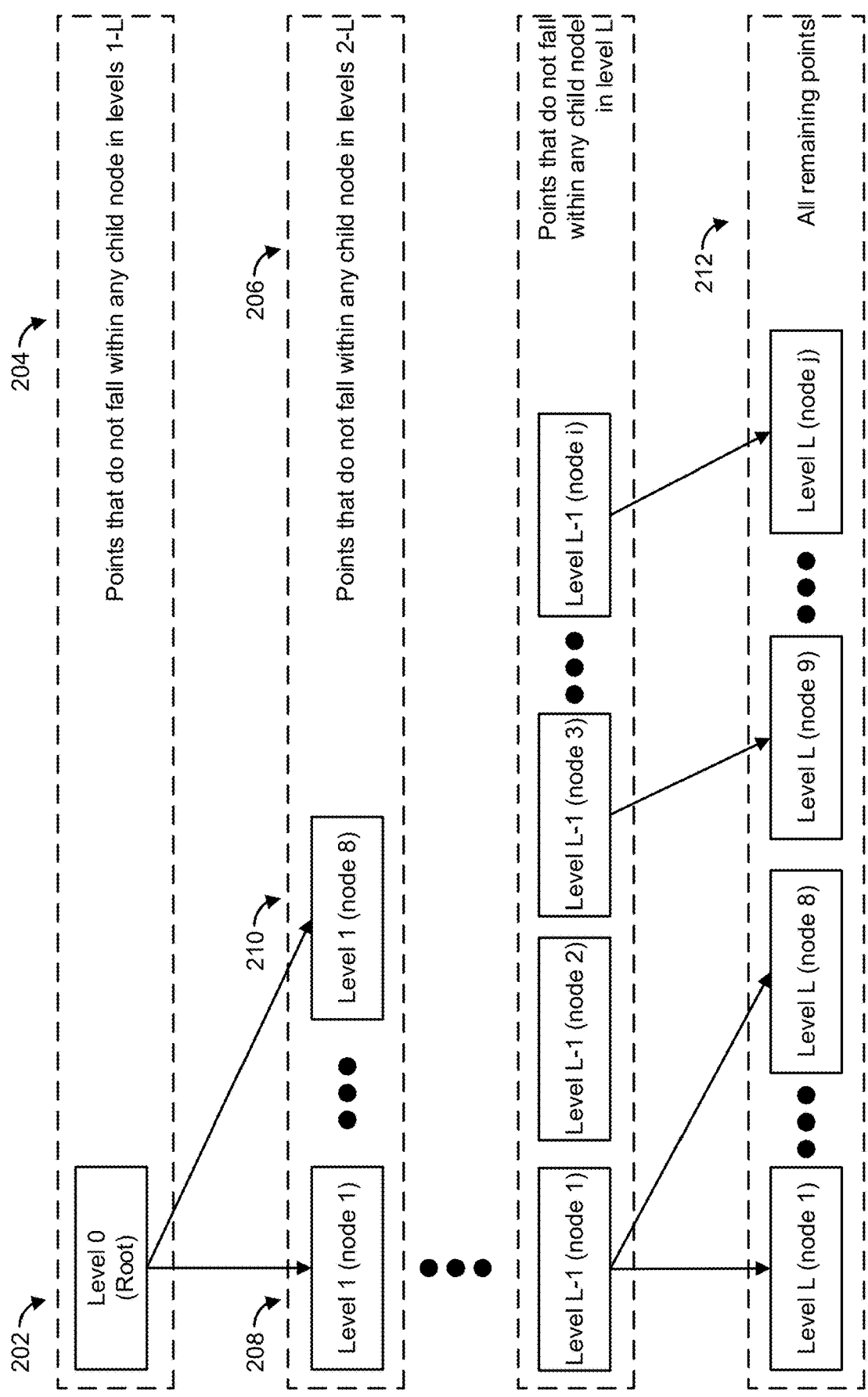
FIG. 2 shows an example of an octree structure that can be used to organize point cloud data in accordance with some aspects of the disclosed subject matter.

FIG. 2 shows an example of an octree structure that can be used to organize point cloud data in accordance with some aspects of the disclosed subject matter. In general, an octree can be characterized as a tree data structure in which internal (i.e., non-leaf) nodes each have exactly eight children. An octree of point cloud data can be created by subdividing the point cloud data into eight regions, and then dividing each of those eight regions into another eight regions, etc., until some condition is satisfied for a particular region and/or a maximum number of levels of division have been reached. Each level of the octree can have one or more nodes (e.g., root node 202) that include data points that do not fall into any of its child nodes. For example, as shown in FIG. 2, root node 202 can include points from the point cloud that lie at the boundary between two or more regions. That is, when the point cloud is subdivided into eight regions, there may be data points that straddle a plane dividing two or more regions. These data points can be associated with the node that is being subdivided. As shown in FIG. 2, a level 204 (sometimes referred to as level 0) can include a single node (e.g., root node 202), and a next level 206 (sometimes referred to as level 1) can include eight nodes (e.g., nodes 208-210), which may each be subdivided into eight regions, associating points that lie on the borders between regions with the node being subdivided, etc. Note that level L does not necessarily include $8^L$ nodes, as some nodes in previous levels may satisfy a condition such that they are not subdivided. For example, if a node includes less than a threshold number of points, the node may not be subdivided again. Note that point cloud data (e.g., point cloud data 102) does not necessarily have a rectangular shape that can be subdivided into equal volumes (e.g., equal cubes, equal rectangular cuboids, etc.). Accordingly, in some aspects, an initial hexahedron (e.g., a cube, a rectangular cuboid, etc.) can be drawn to include all of the points in the point cloud data as a starting point for subdivisions. In some aspects, each node in the octree can be associated with multiple points, and in a point cloud that does not have a uniform density the number of points in each node can vary significantly.

Although the subject matter described herein is generally described in connection with using data organized in an octree, the data can be grouped using any suitable technique to create multiple representations of the point cloud data. For example, the point cloud data can be subdivided into any suitable number of cubes (e.g., 64) and the pixels within each cube can be averaged together, then each initial child cube can be subdivided again and averaged, creating a representation that is less sparse, and this can be carried out any suitable number of times to create representations of the point cloud at various levels of resolution.

In some aspects, each node in the octree can represent an area of space within the point cloud. For example, each node in level 1 can correspond to one octant of the point cloud data. Accordingly, if the viewing angle and/or position of a virtual camera (or cameras for applications such as a CAVE), some nodes represent portions of the scene that do not intersect the view frustum of the virtual camera, and many of the points associated with these nodes can be excluded from consideration for inclusion in the image being rendered for presentation. Conversely, some nodes represent portions of the scene that intersect or are included entirely within the view frustum of the virtual camera, and points associated with these nodes can be considered for inclusion in the image being rendered for presentation.

Figure 3:
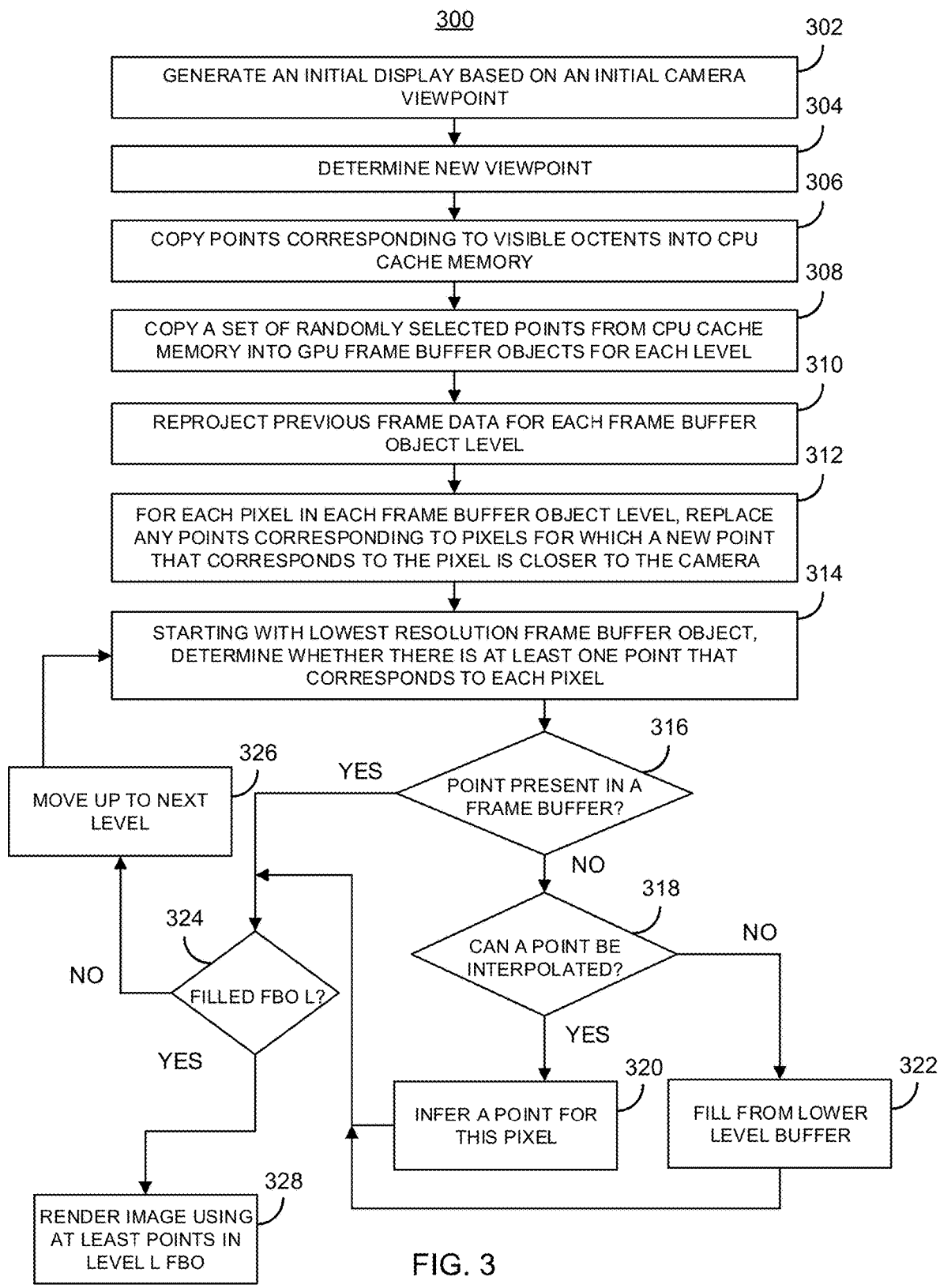
FIG. 3 shows an example of a process for hierarchical progressive point cloud rendering in accordance with some aspects of the disclosed subject matter.

FIG. 3 shows an example 300 of a process for hierarchical progressive point cloud rendering in accordance with some aspects of the disclosed subject matter. As shown in FIG. 3, process 300 can begin by generating an initial image to be displayed based on an initial virtual camera viewpoint. In some aspects, the initial virtual camera viewpoint can be predetermined, and the initial image to be displayed can be predetermined using known points from the point cloud. Alternatively, in some aspects, the initial camera angle may not be predetermined, and the initial image to be displayed can be generated using similar techniques to those described below in connection with 304-328.

At 304, process 300 can determine a new viewpoint of the virtual camera. In some aspects, such as when process 300 is used in connection with a head mounted display, the viewing angle changes by at least a small amount between most frames due to small, potentially involuntary, movements by the wearer and/or large voluntary movements. Process 300 can use any suitable technique or combination of techniques to determine the new viewpoint of the virtual camera.

In some aspects, process 300 can determine which octants (i.e., nodes) of the octree intersect the viewing frustum of the virtual camera. For example, process 300 can use view frustum culling to determine visible nodes. In some aspects, process 300 can sort the visible nodes front-to-back based on Euclidean distance to the current camera position, and can use the point density estimate function to determine how many points are potentially visible to the user for each visible octant and determine how many points are loaded from file.

At 306, process 300 can copy points corresponding to the visible octants from the point cloud data (e.g., in storage or memory) into the CPU cache memory. In some aspects, the CPU can determine which octant(s) are visible based on viewpoint information, and can copy the points corresponding to the visible octants (e.g., as determined at 304). Additionally, in some aspects, process 300 can copy some points that may fall outside the current viewing frustum of the virtual camera, as this can facilitate more quickly rendering points that were just off screen in the previous frame.

At 308, process 300 can copy a set of points from the CPU cache (e.g., CPU cache 108) into a frame buffer object for each level (e.g., from level 0 to level L), such that for the lowest resolution level (i.e., the root level in FIG. 2), the lowest number of points are copied, and for the highest resolution level the most points are copied. For example, if S points are copied for the highest resolution frame buffer object corresponding to level L, S/2 points can be copied for level L−1, S/4 points can be copied for level L−2, and $S/2^L$ points can be copied for level 0 (i.e., the root node). In some aspects, any suitable technique can be used to select the points from the visible octants to copy to the GPU at each level. For example, process 300 can select the points to be copied randomly from all visible octants at the level corresponding to the frame buffer. As another example, process 300 can select the points randomly with a bias in favor of octants that are closer to the camera position. In some aspects, the points can be selected for each frame from the whole dataset of points included in visible octants (i.e., selection with replacement). In some aspects, points that are selected for a particular frame can be inhibited from being selected again until all points from a particular octant have been selected for a frame (i.e., selection without replacement). In some aspects, points that are selected for a particular frame can be inhibited from being selected again for a particular number of frames. In some aspects, each frame buffer object can include more pixels than correspond to the image to be rendered, which can, in some cases, facilitate more quickly rendering points that were just off-screen in the previous frame.

At 310, process 300 can reuse the data that was included in the frame buffer object for each level used in rendering the previous frame. For example, the points in the frame buffer object for each level can be copied to a second frame buffer object when the previous frame is rendered. In some aspects, process 300 can draw a screen-filling point grid with one point per pixel using the points from the previous frame, and the previous frame's render target buffer can be bound as a read texture and drawn to a second render target. For each point, the coordinates can be used as texture coordinates into the color texture. In some aspects, the frame buffers can have a first binding point for the geometry and color, and a second binding point for the depth. Additionally, in some aspects, the frame buffers can have a 32 bit floating point format, whereas the octree data can be stored in a binary format, with each point having a size of 16 bytes, twelve bytes for the 3D position, and four bytes for a packed RGBA color in a depth first order. One byte (the alpha channel "A," which is typically used to denote the opacity of a pixel) of the packed RGBA color can be used to represent the current level of the octree from which the system renders the point. A binary meta-data file can hold the octree structure, and can include bounding box information that indicates which area of space is bounded by each octant.

In some aspects, for each point from the previous frame in a particular frame buffer object, process 300 can push the depth value of the point back away from the camera if the point was previously interpolated (e.g., as described below in connection with 320) rather than being inserted from the point cloud, or points that originated in a lower resolution level frame object buffer (e.g., as described below in connection with 322). In some aspects, the point can be pushed back by any suitable amount, such as by an amount based on a value, PBA (greater than one), that can be selected by a user (e.g., a developer or administrator). That is, the new depth value for the re-projected point can be the previous depth value multiplied by PBA, thereby increasing the depth value assigned to the point. This can increase the likelihood that a point copied from the CPU will replace these points.

At 312, process 300 can replace (e.g., by overwriting) the point corresponding to each pixel in a particular frame buffer object corresponding to a particular level when a new point copied from the CPU cache for that level is closer to the camera than the point from the last frame. In some aspects, the new points that are closer to the camera can overwrite the point for that pixel from the previous frame. In some aspects, process 300 can apply a random world space offset to one or more points copied from the CPU cache prior to comparing the points to points from the previous frame. However, in order to avoid introducing noise when reprojecting these points (e.g., if the offset were recursed upon), the stored world coordinates for the point are not changed to add the random offset. In some aspects, the random offset can be set to a radius of 1-2 millimeters, meaning that the offset generally does not result in a point projecting to a different pixel than normal. However, when the camera is close to a surface, the random offset can allow walls to appear filled in by causing some points that would otherwise correspond to the same pixel to correspond to different pixels, whereas without the offset these walls may appear to be semitransparent.

At 314, process 300 can determine, for each pixel of the lowest resolution frame buffer, whether a point corresponds to that pixel. If there is a pixel that does not have a corresponding point ("NO" at 316), process 300 can move to 318 to determine if a point can be interpolated for that pixel from points associated with surrounding pixels. In some aspects, process 300 can determine that a point can be interpolated if at least a threshold number of neighboring pixels are associated with points. If process 300 determines that a point can be interpolated for a pixel ("YES" at 318), process 300 can move to 320 and can interpolate the point based on surrounding points. For example, process 300 can use points from surrounding pixels to generate the new point (sometimes referred to as a "hallucinated" point, which can be created by "hallucinating" the point from the surrounding points) as shown by point H1 in FIG. 4, which was created based on the values of at least points P1 and P2.

Otherwise, if no point can be interpolated at a pixel ("NO" at 318), process 300 can move to 322. At 322, process 300 can fill the pixel using a point from a frame buffer object that is, for example, one level lower resolution. In some aspects, the position of the point from the lower resolution buffer can be linearly interpolated with neighboring pixels in the current level frame buffer object, which can in some cases reduce the incidence of block artifacts. For example, as shown in FIG. 4 in connection with points H2 and H3, process 300 can perform a linear interpolation between that point with neighbors and it can be stored in the current level frame buffer object. In FIG. 4, H2 represents a pixel for which data cannot be hallucinated from neighboring points, so a lower frame buffer level is sampled at a corresponding pixel. In the case of H2, a point could have originated from the frame buffer corresponding to octree level 1, whereas H3 represents a point in which no higher octree frame buffer object contains a point for that pixel, and a point is used that originated at level 0. If there is a pixel in the frame buffer object corresponding to level 0 for which no point exists, and for which a point cannot be inferred from neighbors, the pixel may remain unfilled. However, it is possible that the pixel will be filled at a higher level frame buffer by a point, or an interpolated point.

If there is a point corresponding to a pixel in a frame buffer object for the current level ("YES" at 316), after the pixel has been filled at 320 or 322, or after no point can be found or inferred, process can move to 324 to determine whether the highest resolution frame buffer object has been filled using previous points, new points, inferred points, lower level points, and/or blanks. If the highest resolution frame buffer object has not been filled (i.e., the current frame buffer is not the highest resolution buffer) ("NO" at 324), process 300 can move to 326 and move to the next level frame buffer object. Otherwise, if the highest resolution frame buffer object has been filled ("YES" at 324), process 300 can move to 328.

At 328, process 300 can render an image using points from the highest resolution frame buffer object. In some aspects, an additional transformation can be included in the pipeline, such that the fragment position p can be represented as:

$$p=[1-W,1-W,1,1]^t \cdot P \cdot MV \cdot v, \qquad (1)$$

where MV is the modelview matrix, P is the projection matrix, and W is the percentage of view which is to be extended. Additionally, in some aspects, process 300 can look up color information for each point, taking into account that data may have been rendered off screen via the W value from Equation 1. For example, a geometry shader can narrow the default (0-1) texture coordinates to (W'-W") used for lookup via the following:

$$W'=((1.0-W)*0.5), \qquad (2)$$

$$W''=1.0-W', \qquad (3)$$

In some aspects, throughout the pipeline, point color can be packed into the alpha component of the floating point geometry buffer. Accordingly, as a final step, each pixel's final color can be unpacked from the geometry buffer's alpha component and rendered to screen.

Figure 5:
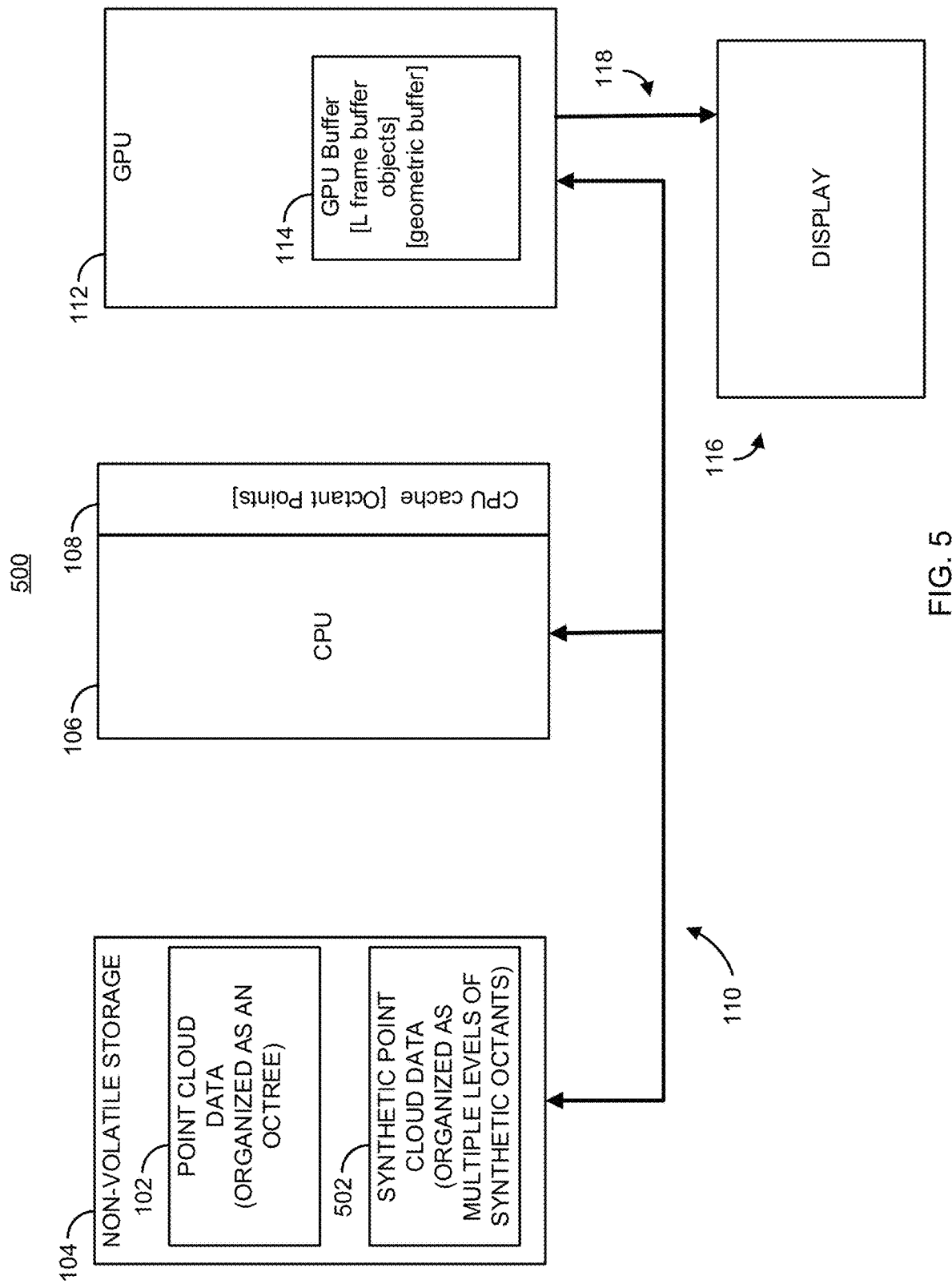
FIG. 5 shows an example of another system for hierarchical progressive point cloud rendering in accordance with some aspects of the disclosed subject matter.

FIG. 5 shows an example 500 of another system for hierarchical progressive point cloud rendering in accordance with some aspects of the disclosed subject matter. In some aspects, system 500 can be similar to system 100, and can include synthetic point cloud data 502 in non-volatile storage 104 (and/or in memory, such as RAM, not shown) in addition to, or in lieu of, point cloud data 102. In some aspects, point cloud data 102 can be stored in non-volatile storage 104, but may not be used to render the scene (e.g., the scene can be rendered based solely on synthetic point cloud data 502). Alternatively, in some aspects, point cloud data 102 can be omitted from non-volatile storage 104. As described below in connection with FIGS. 6 and 7, synthetic point cloud data 502 can be used to represent one or more lower resolution regularized representations of point cloud data 102 that is based on the points in point cloud data 102. As described above, in some aspects, point cloud data 102 can include any suitable number of points of data that collectively represent the state of one or more scenes, while a particular synthetic point cloud can have a limited number of points based on the number of cells (or voxels) that the point cloud was subdivided into when generating the synthetic point cloud. In some aspects, synthetic point cloud data 502 can include multiple files that can be used to represent the point cloud data at various resolutions. For example, a first file can be used to implement an octree-like organization of the point cloud information. In such an example, the first file can include, for each octant represented in a level of the synthetic point cloud (e.g., corresponding to a node in an octree), the bounds of the octant within the point cloud (e.g., the volume represented by that octant), the number of points in the octant, and the number of child octants (e.g., corresponding to leaf nodes in an octree). As another example, a second file can be used to represent the positions and color of points in synthetic point cloud data 502. In such an example, the second file can be a binary file that stores each point using three binary numbers to represent the x, y, and z coordinates, and a fourth binary number to represent the color (e.g., as a packed RGB value). In a more particular example, the x, y, and z coordinates can each be represented by a single byte (e.g., as described below in connection with FIGS. 7 and 9), and the color can be represented by three bytes (e.g., one for each color channel). As yet another example, a third file can be used to represent the position within the second file at which each data for each octant (e.g., corresponding to a node of the octree) starts. In some aspects, each file can be organized in a depth first manner or a breadth first manner. For example, each file can be organized in a breadth first manner such that data from each octant in the lowest resolution level (which may represent the entire bounding box of the point cloud as described below in connection with FIG. 6) is stored first, then data from each octant in the next highest resolution is stored, etc. As another example, each file can be organized in a depth first manner such that data from a first octant in the lowest resolution level (e.g., octant 1, level 0, which may represent the entire bounding box of the point cloud as described below in connection with FIG. 6) is stored first, then data from a first child octant in the second lowest resolution level (e.g., octant 1, level 1), then data from a first child of that octant, (e.g., octant 1, level 2), etc., until the first octants present at a highest resolution are each stored (e.g., octants 1-8, level L), then data from a next octant in the next to highest resolution can be stored (e.g., octant 2, level L−1), etc.

Figure 6:
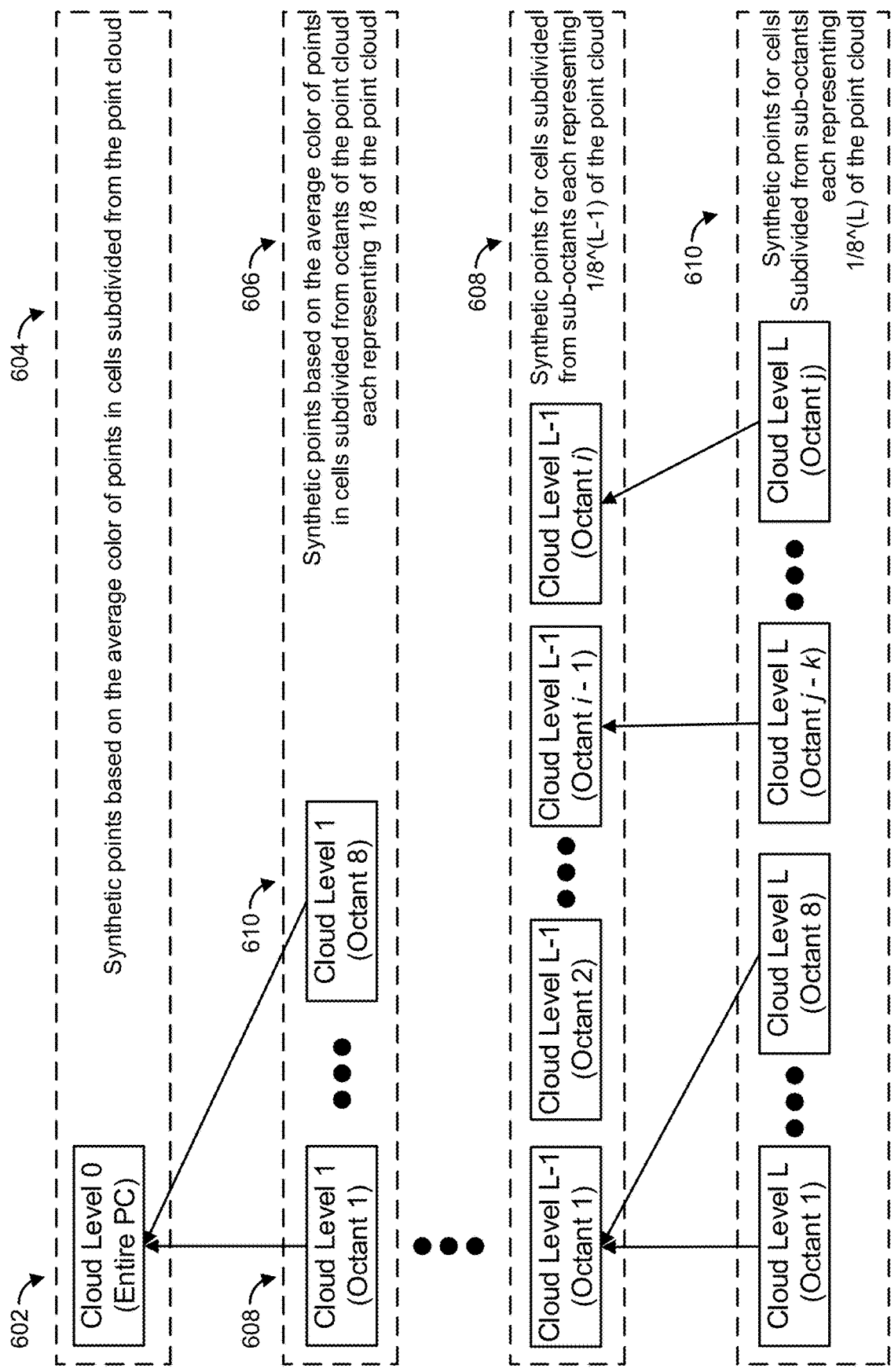
FIG. 6 shows an example of a structure that can be used to organize synthetic point cloud data in accordance with some aspects of the disclosed subject matter.

FIG. 6 shows an example of a structure that can be used to organize synthetic point cloud data in accordance with some aspects of the disclosed subject matter. As shown in FIG. 6, point cloud data (e.g., point cloud data 102) can be preprocessed to generate various synthetic point clouds of varying resolution. Unlike in FIG. 2, each level shown in FIG. 6 can include data representing all points in the original point cloud (e.g., point cloud 102), rather than an octree in which each level represents only part of the point cloud. For example, in some aspects, a first synthetic point cloud (e.g., represented as level 604) can include a single volume 602 that encompasses the entire point cloud, and that includes data points that collectively represent the data points from the original point cloud (e.g., as described below in connection with FIGS. 8A to 8E). In some aspects, synthetic point cloud 604 can be a lowest resolution representation of the original point cloud.

Similarly, in some aspects, a second synthetic point cloud 606 can include multiple volumes 608-610 that each encompasses a fraction of the point cloud (e.g., as indicated by the arrows pointing from 608 and 610 to volume 602, indicating that these volumes represent points encompassed by volume 602), and that each includes data points that collectively represent the data points in that fraction of the point cloud (e.g., as described below in connection with FIGS. 8F and 8G). In some aspects, any suitable number of synthetic point clouds can be generated that include smaller and smaller volumes that are each subdivided into cells, and that are each represent the points in a smaller volume of the point cloud. For example, a highest resolution synthetic point cloud 608 can include many relatively small volumes (e.g., i total octants that were subdivided from octants represented in a previous point cloud) that each represents a relatively small portion of the entire point cloud (e.g., as described below in connection with FIG. 8H, each octant in synthetic point cloud 606 can be sub-divided into octants). Note that, as described in connection with the octree of FIG. 2, there may not be $8^{L-1}$ octants in synthetic point cloud 608, as an octant from the previous synthetic point cloud may not be subdivided if it includes less than a particular number of points from the point cloud. For example, data for a particular sub-octant (e.g., an octant in a level below level 0) can be stored if it includes at least one point, and data for sub-octants that do not include any points can be omitted. In a more particular example, if only one particular octant in level 3 includes points (e.g., 1 to $n^3$ points), level 4 can include only one child octant for level 3 that corresponds to those points. In some aspects, point cloud 610 shown in FIG. 6 can be the highest resolution of synthetic point cloud data.

Figure 7:
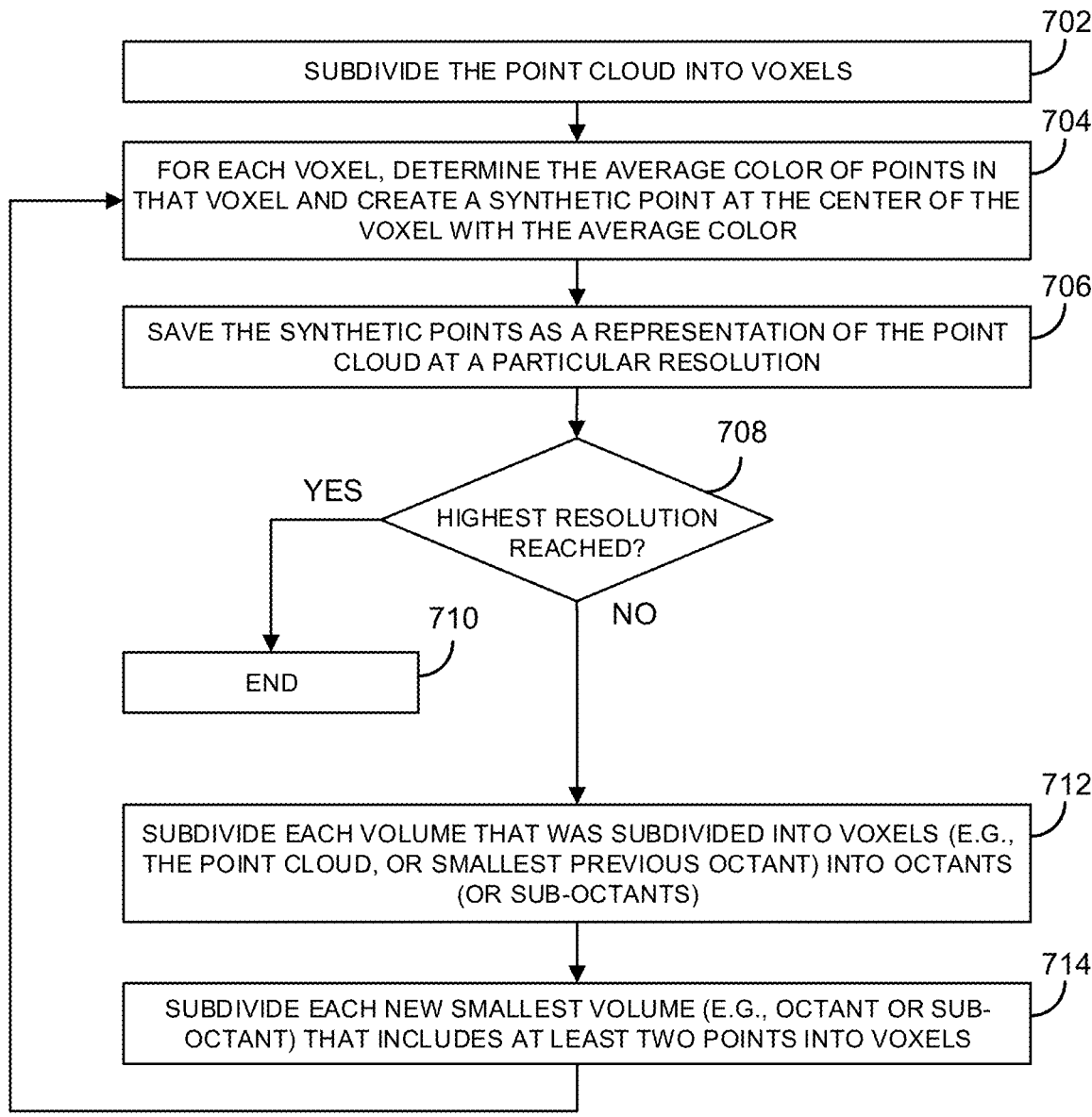
FIG. 7 shows an example of a process for generating synthetic point cloud data that can be used in connection with a hierarchical progressive point cloud rendering process in accordance with some aspects of the disclosed subject matter.

FIG. 7 shows an example 700 of a process for generating synthetic point cloud data that can be used in connection with a hierarchical progressive point cloud rendering process in accordance with some aspects of the disclosed subject matter. As shown in FIG. 7, process 700 can begin at 702 by subdividing the point cloud into voxels. In some aspects, process 700 can subdivide the point cloud into any suitable number of voxels representing any suitable dimensions. For example, in some aspects, the point cloud can be subdivided evenly along each axis to create cells that each encompass a particular portion of the point cloud. In some aspects, process 700 can subdivide the point cloud into $n^3$ cells, where n can be the number of subdivisions along each axis. For example, process 700 can subdivide the point cloud data into $256^3$ cells. As another example, process 700 can subdivide the point cloud data into $128^3$ cells.

At 704, process 700 can determine, for each voxel or cell, the average color of points that fall within the space represented by the voxel, and can create a synthetic point at the center of that voxel having the average color. In some aspects, process 700 can use any suitable technique or combination of techniques to determine the average color. For example, in some aspects, process 700 can calculate a simple average of colors for points represented by each voxel (e.g., by summing the color values, and dividing by the number of points). In some aspects, each point in the original point cloud data can be associated with a single voxel (e.g., points that lie at the border of two or more voxels can be associated with one of the voxels). As another example, process 700 can use a luminance preserving technique to average the colors (e.g., a technique that weights each points color based on luminance of that point). In a more particular example, as described below in connection with FIGS. 8B to 8E, synthetic points can be generated that represent the average color of points in each voxel.

At 706, process 700 can save the synthetic points created at 704 as a representation of the point cloud at a particular resolution. For example, if the point cloud is subdivided into $n^3$ cells, the synthetic points can be saved as a representation of the point cloud that includes up to $n^3$ points. In a more particular example, if the point cloud is subdivided into $256^3$ cells, the synthetic points can be saved as a representation of the point cloud that includes up to about 16.7 million points.

At 708, process 700 can determine whether the highest resolution representation of the point cloud has been generated. For example, in some aspects, synthetic point cloud representations can be generated until each cell within the highest resolution synthetic point cloud represents a particular volume of the scene. In a more particular example, synthetic point cloud representations can be generated until the spacing between midpoints of adjacent cells is less than about 1 millimeter (mm), 2 mm, 5 mm, 10 mm, etc., which can be calculated based on the size of the smallest sub-octant (e.g., along a particular dimension if the octants are not cubes, such as a smallest dimension, or an average dimension) divided by the number of cells along that dimension (e.g., if the smallest octant represents a cube 250 mm on a side, and the octant is subdivided into $128^3$ cells, the midpoints of adjacent cells would be a little less than 2 mm apart). As another example, a predetermined number of synthetic point cloud representations (e.g., three, four, etc.) can be generated, and process 700 can determine whether the predetermined number of synthetic point cloud representations have been generated. As yet another example, in some aspects, process 700 can determine whether the most recently created synthetic point cloud includes a number of cells that is at least a threshold fraction of the number of points in the original point cloud data. As still another example, in some aspects, process 700 can determine whether the number of points in the most recently created synthetic point cloud is at least a threshold fraction of the number of points in the original point cloud data. In a more particular example, process 700 can determine that the number of points (and/or cells) in a most recently created synthetic point cloud is equal to at least one quarter (or any other fraction) of the points included in the original point cloud.

If process 700 determines that the highest resolution synthetic point cloud has been generated ("YES" at 708), process 700 can end at 710. Otherwise, if process 700 determines that the highest resolution synthetic point cloud has not been generated ("NO" at 708), process 700 can move to 712. At 712, process 700 can subdivide each volume that was previously subdivided into voxels (e.g., the entire point cloud at 702, or smallest previously present octants) into octants (or sub-octants). For example, if the previously generated synthetic point cloud was generated based on the entire point cloud subdivided into n³ voxels, process 700 can subdivide the point cloud into octants (e.g., a 2×2×2 grid). As another example, if the previously generated synthetic point cloud was generated based on octants that each represented ⅛ of the point cloud which were each subdivided into n³ voxels, process 700 can subdivide each octant representing ⅛ of the point cloud into octants that each represent 1/64 of the point cloud. Note that although the scene is generally described herein as being subdivided into octants, which can then also be subdivided into octants, this is merely an example, and the scene can be subdivided into a number of subdivisions other than eight.

At 714, process 700 can subdivide each new smallest volume (e.g., octant or sub-octant representing the smallest portion of the point cloud) into voxels. For example, if the point cloud was subdivided into octants at 712, process 700 can subdivide each octant into n³ cells, where n can be the number of subdivisions along each axis. For example, process 700 can subdivide the point cloud data into $256^3$ cells. In some aspects, process 700 can subdivide each volume into the same number of voxels regardless of how large a portion of the point cloud is represented.

In some aspects, process 700 can subdivide a particular volume (e.g., point cloud, octant, or sub-octant) into voxels if the volume includes at least a threshold number of points. For example, in some aspects, process 700 can subdivide the volume into voxels if the volume includes at least one point.

In some aspects, after subdividing each of the smallest volumes into voxels at 714, process 700 can return to 704 to generate a synthetic point for each voxel based on the average color of points within each voxel, and at 706 to save the resulting synthetic point cloud as a higher resolution representation of the point cloud (as compared to a last version saved at 706).

In some aspects, each point in a synthetic point cloud can be addressed based on the smallest volume in which the point is included (e.g., the entire point cloud, an octant, a sub-octant, etc.) and based on the voxel represented by the point. For example, in some aspects, each synthetic point cloud can be identified as corresponding to a particular number of volumes (e.g., octants), and each point can be addressed based on the location of the voxel that is represented by the point. In some aspects, each point within a volume can be addressed using three coordinates referenced to a particular point on the volume (e.g., a particular corner). For example, if each volume is subdivided into $256^3$ voxels, each point can be addressed using three bytes. In such an example, each byte can represent a position along one axis of the volume to reference a particular voxel. In some aspects, the total number of volumes in a particular synthetic point cloud can be related to the level L of the point cloud (e.g., as described above in connection with FIG. 6) such that the total number of volumes is $8^L$. For example, the original point cloud can be $8^0=1$ volumes, the point cloud divided into octants can be subdivided into $8^1=8$ volumes, the point cloud in which those octants are each subdivided into octants can be subdivided into $8^2=64$ total volumes, etc.

Figure 8A:
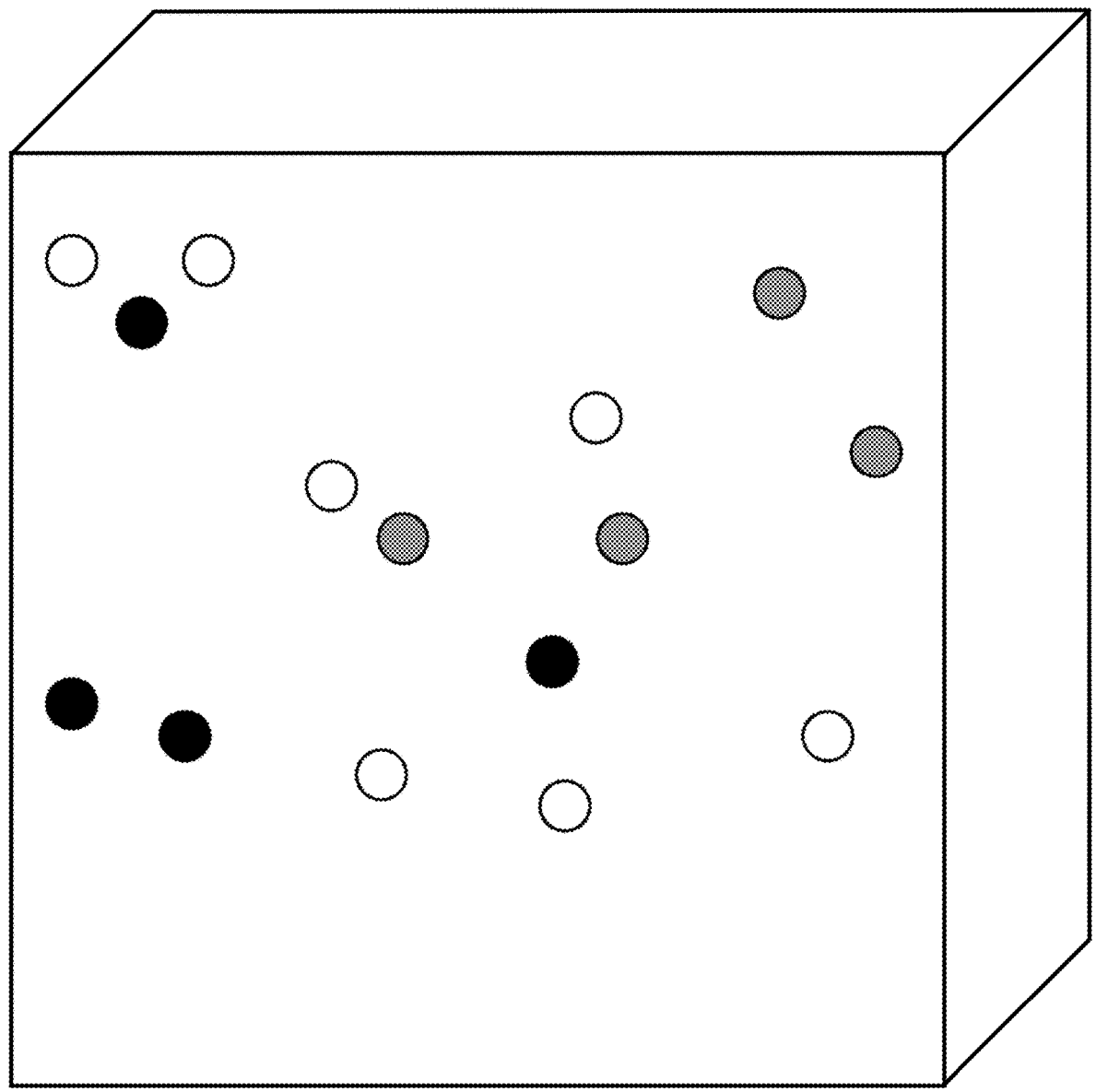
FIG. 8A shows an example diagram representing a portion of a point cloud that can be used in connection with a hierarchical progressive point cloud rendering process in accordance with some aspects of the disclosed subject matter.

FIG. 8A shows an example diagram representing a portion of a point cloud that can be used in connection with a hierarchical progressive point cloud rendering process in accordance with some aspects of the disclosed subject matter. As shown in FIG. 8A, a point cloud can include various points that each is associated with a location in space and a color. Note that the representation in FIG. 8A is simplified to avoid overcomplicating the figure, and point clouds can include very large numbers of points (e.g., hundreds of millions to billions of points).

Figure 8B:
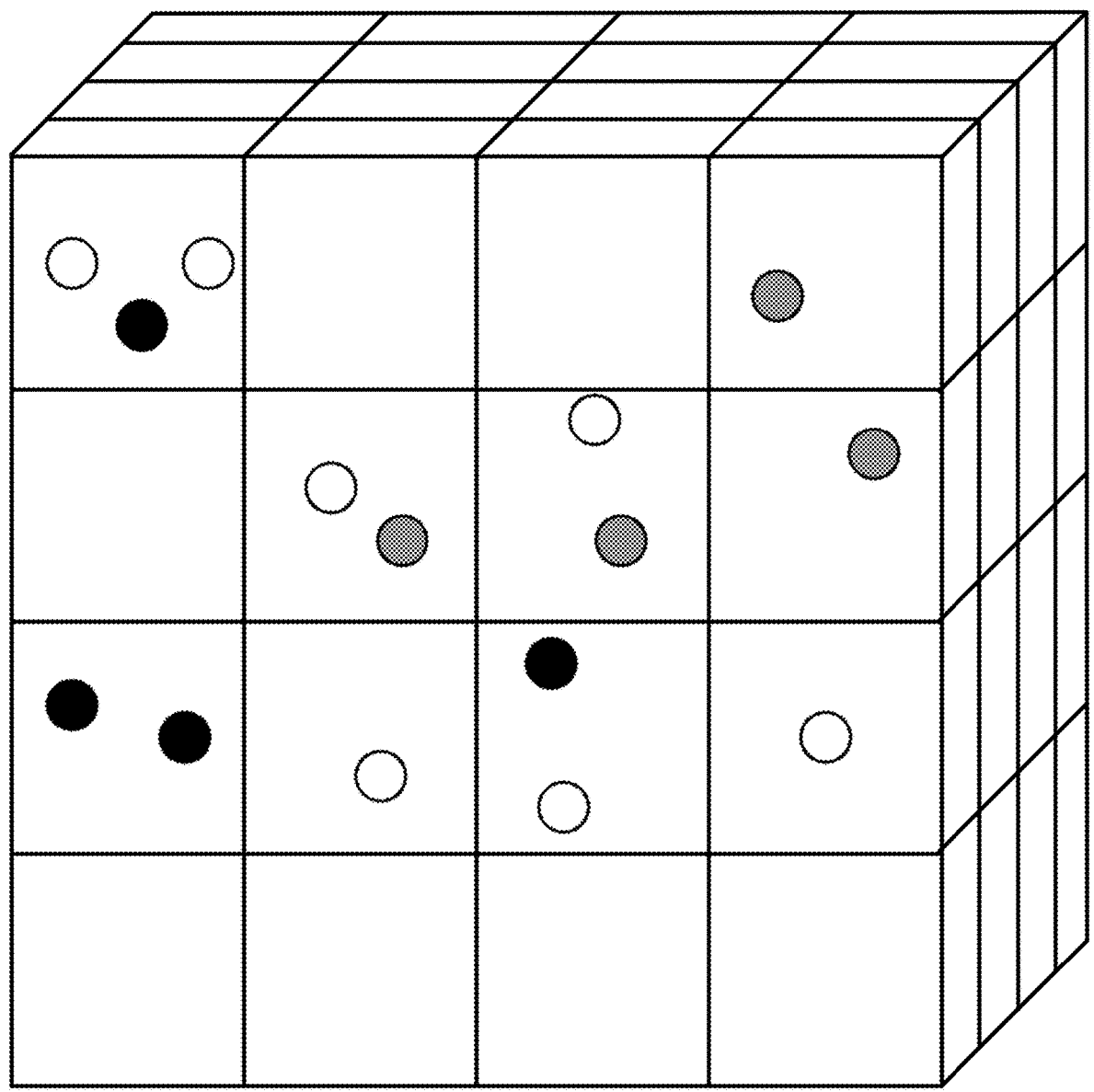
FIG. 8B shows an example diagram representing the portion of the point cloud subdivided into equal sized cells in accordance with some aspects of the disclosed subject matter.

FIG. 8B shows an example diagram representing the portion of the point cloud subdivided into equal sized cells in accordance with some aspects of the disclosed subject matter. As shown in FIG. 8B, in some aspects, the point cloud can be subdivided into voxels by subdividing each axis into equal subdivisions. In the example shown in FIG. 8B, each axis is subdivided into four equal parts, resulting in a total of 64 voxels being used to represent the point cloud. Note that this is merely an example, and the point cloud can be subdivided into any suitable number of voxels (e.g., $128^3$, $256^3$ voxels). As shown in FIG. 8B, some voxels can enclose one or more points, while other voxels can be empty of points.

Figure 8C:
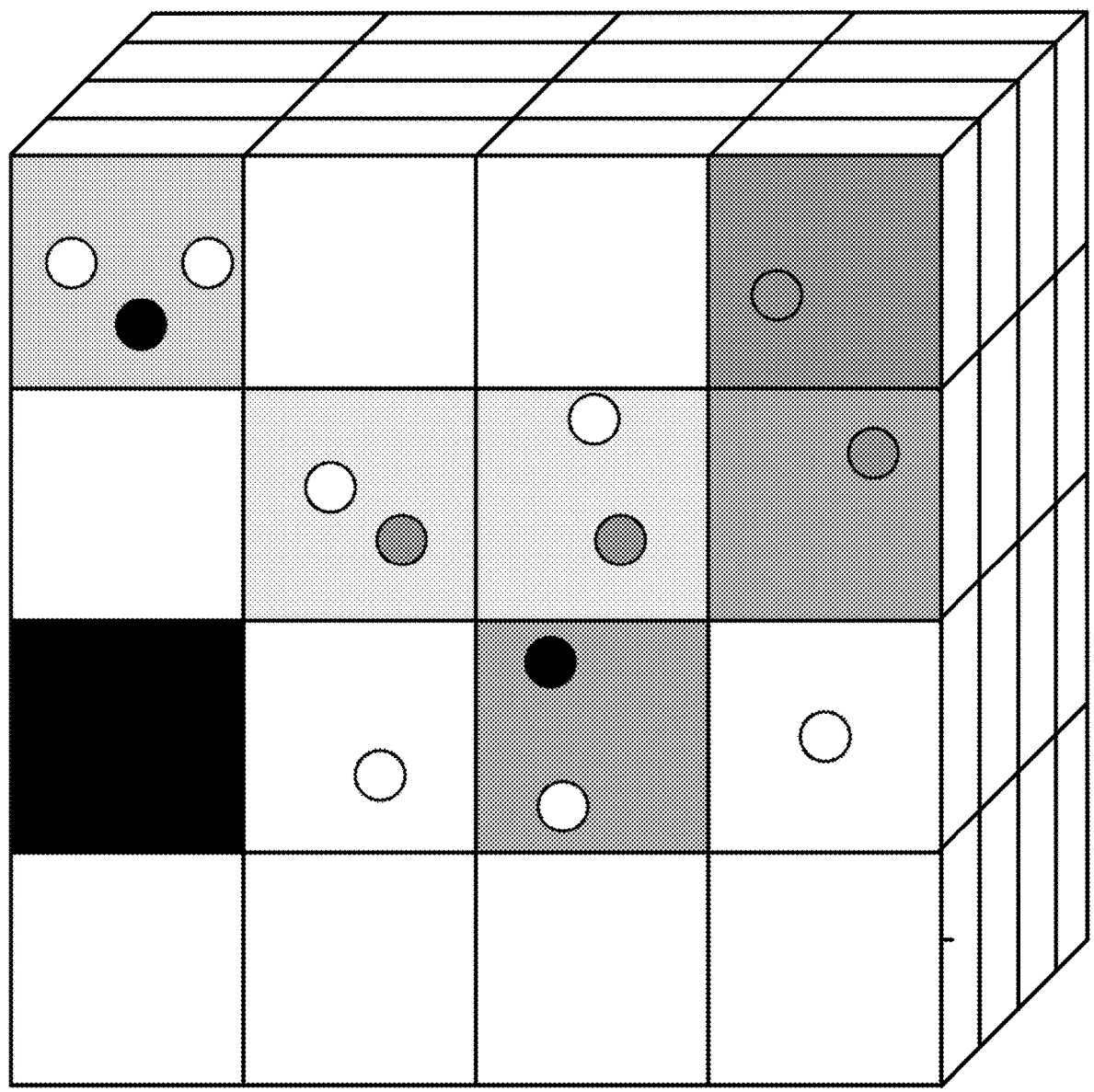
FIG. 8C shows an example diagram representing a portion of the point cloud subdivided into equal sized cells with the average color of points within the cell shown overlaid on the points in accordance with some aspects of the disclosed subject matter.

FIG. 8C shows an example diagram representing a portion of the point cloud subdivided into equal sized cells with the average color of points within the cell shown overlaid on the points in accordance with some aspects of the disclosed subject matter. As shown in FIG. 8C, in some aspects, the average color of points within each voxel can be calculated.

Figure 8D:
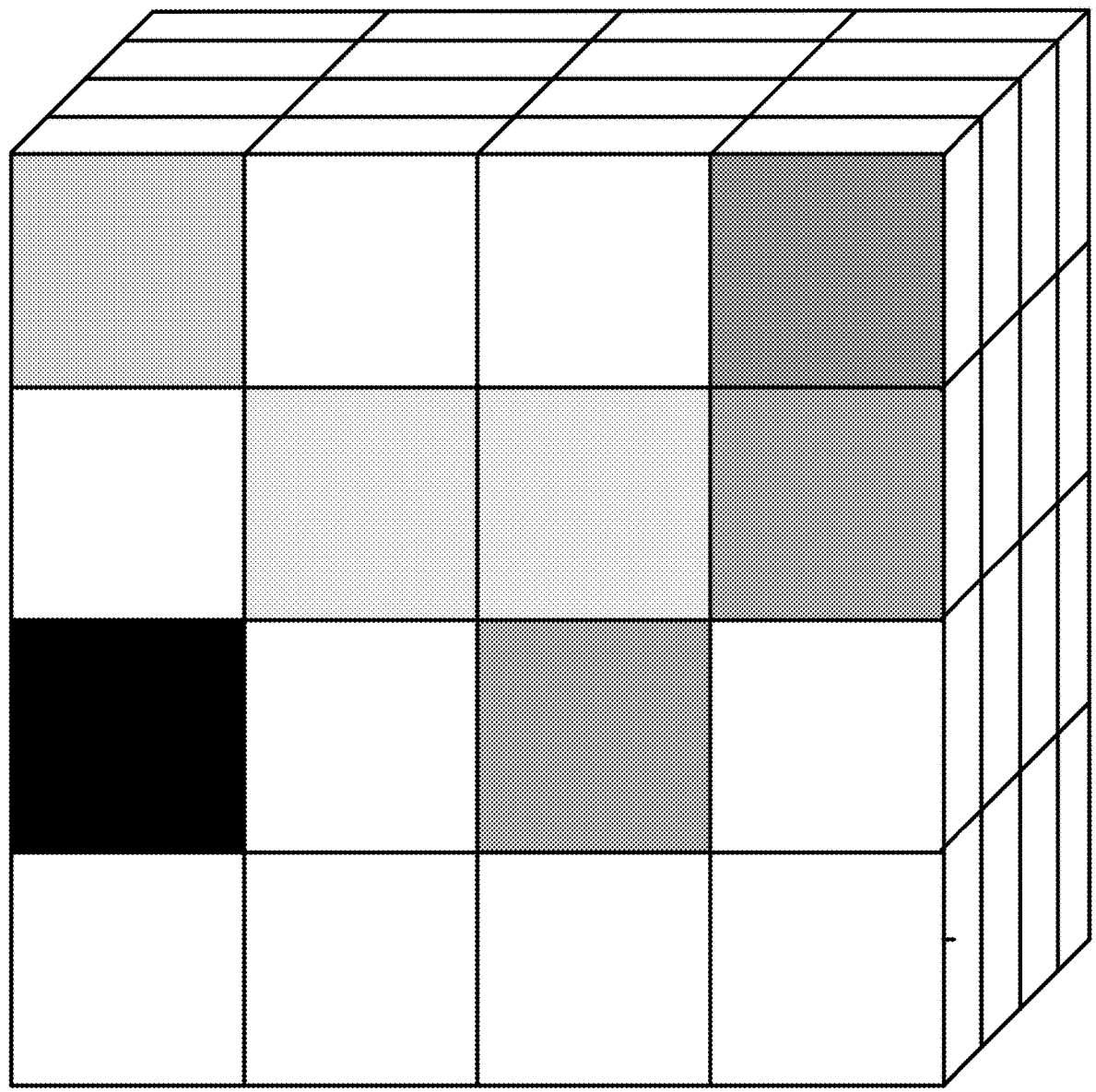
FIG. 8D shows an example diagram representing the portion of the point cloud subdivided into equal sized cells with the average color of points within the cell shown without the points in the cell in accordance with some aspects of the disclosed subject matter.

FIG. 8D shows an example diagram representing the portion of the point cloud subdivided into equal sized cells with the average color of points within the cell shown without the points in the cell in accordance with some aspects of the disclosed subject matter. As shown in FIG. 8D, in some aspects, the original points can be disregarded, while retaining the average color information.

Figure 8E:
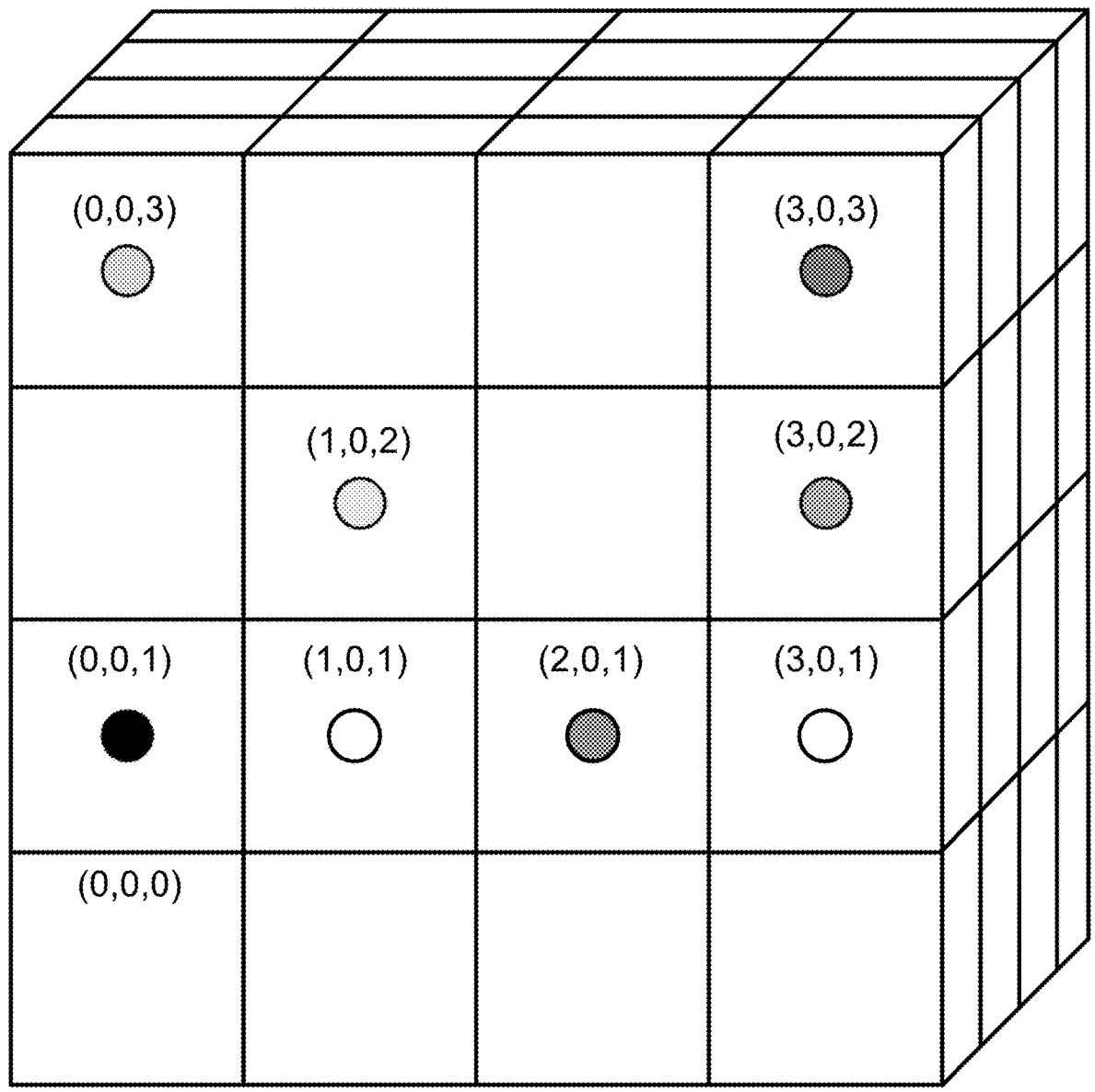
FIG. 8E shows an example diagram representing the portion of the point cloud subdivided into equal sized cells with synthetic points of the average color populating the cells in accordance with some aspects of the disclosed subject matter.

FIG. 8E shows an example diagram representing the portion of the point cloud subdivided into equal sized cells with synthetic points of the average color populating the cells in accordance with some aspects of the disclosed subject matter. As shown in FIG. 8E, in some aspects, a synthetic point can be generated for each voxel that included at least one point, and each synthetic point can be addressed by a combination of three coordinates (e.g., X, Y, and Z coordinates).

Figure 8F:
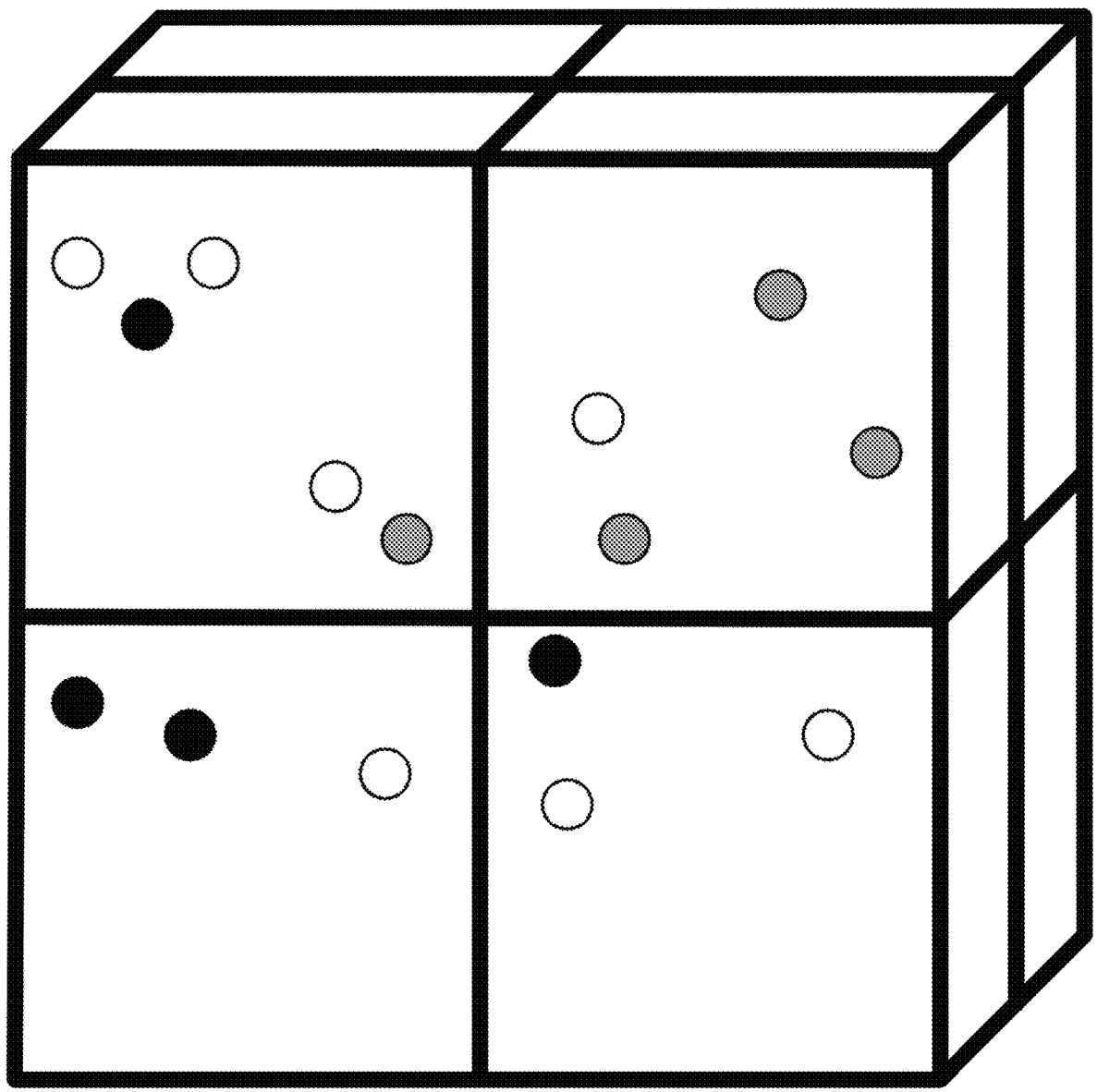
FIG. 8F shows an example diagram representing the portion of the point cloud subdivided into octants in accordance with some aspects of the disclosed subject matter.

FIG. 8F shows an example diagram representing the portion of the point cloud subdivided into octants in accordance with some aspects of the disclosed subject matter. As shown in FIG. 8F, in some aspects, the point cloud can be subdivided into octants that each include ⅛ of the original point cloud. Note that, although the point cloud in FIGS. 8A-8H is represented as a cube, this is merely an example, and a point cloud can have other shapes. In some aspects, the octants can each represent the same volume of space (e.g., the octants can have the same length, width, and height). Alternatively, in some aspects, the octants can represent unequal volumes of space, and the divisions along each axis can be made to subdivide the point cloud to have about the same number of points in each half of the bounding volume. This can result in each group of four octants representing a contiguous half of the volume including about the same number of points from the original point cloud.

Figure 8G:
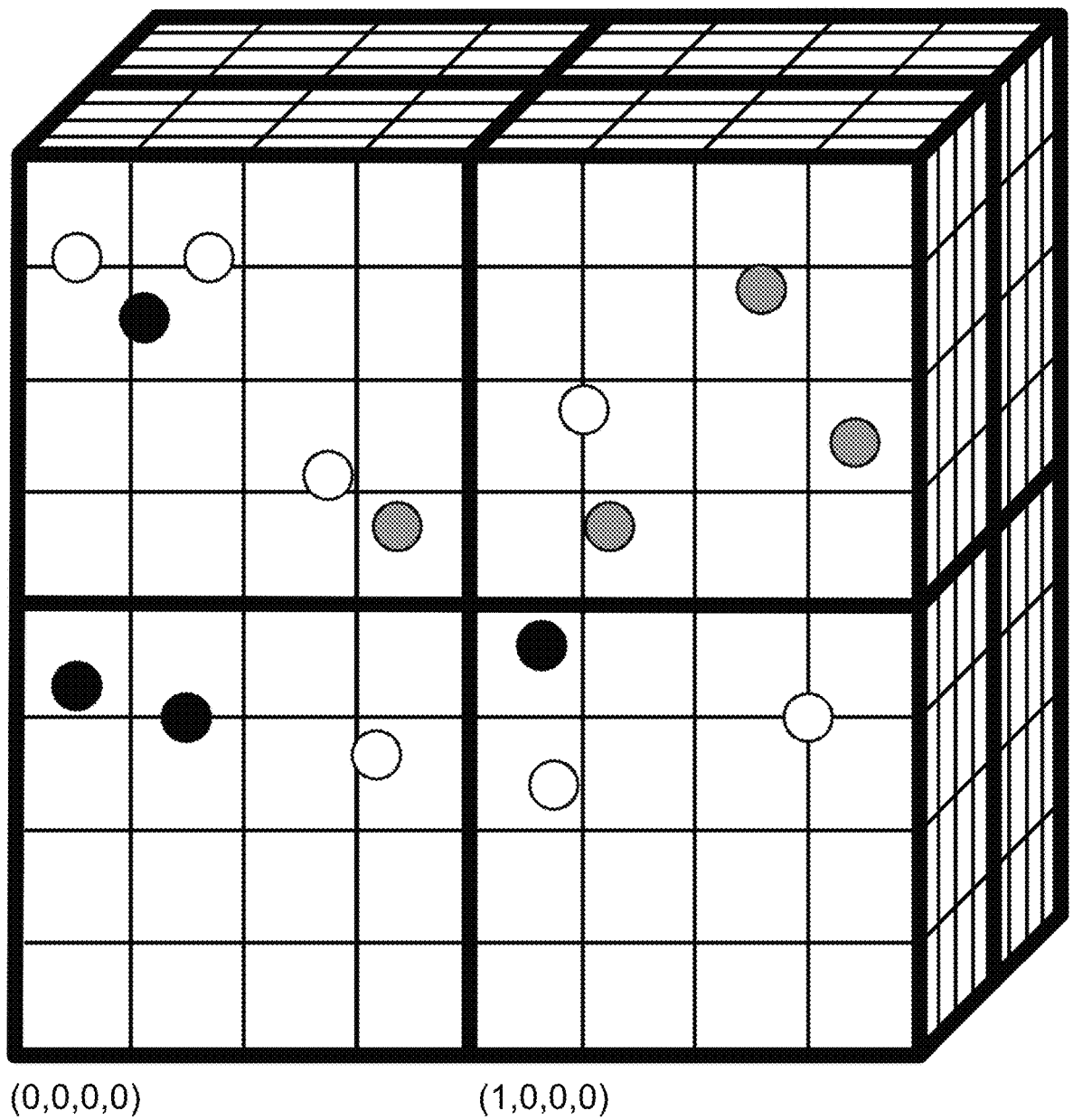
FIG. 8G shows an example diagram representing the portion of the point cloud with each octant subdivided into equal sized cells in accordance with some aspects of the disclosed subject matter.

FIG. 8G shows an example diagram representing the portion of the point cloud with each octant subdivided into equal sized cells in accordance with some aspects of the disclosed subject matter. As shown in FIG. 8G, in some aspects, each octant can be subdivided into voxels that each represent the same fraction of the octants that each voxel in FIG. 8B represented of the entire point cloud. In some aspects, an average color can be calculated for each voxel in FIG. 8G, which can be used to generate synthetic points (e.g., as described above in connection with FIGS. 8C to 8F).

Figure 8H:
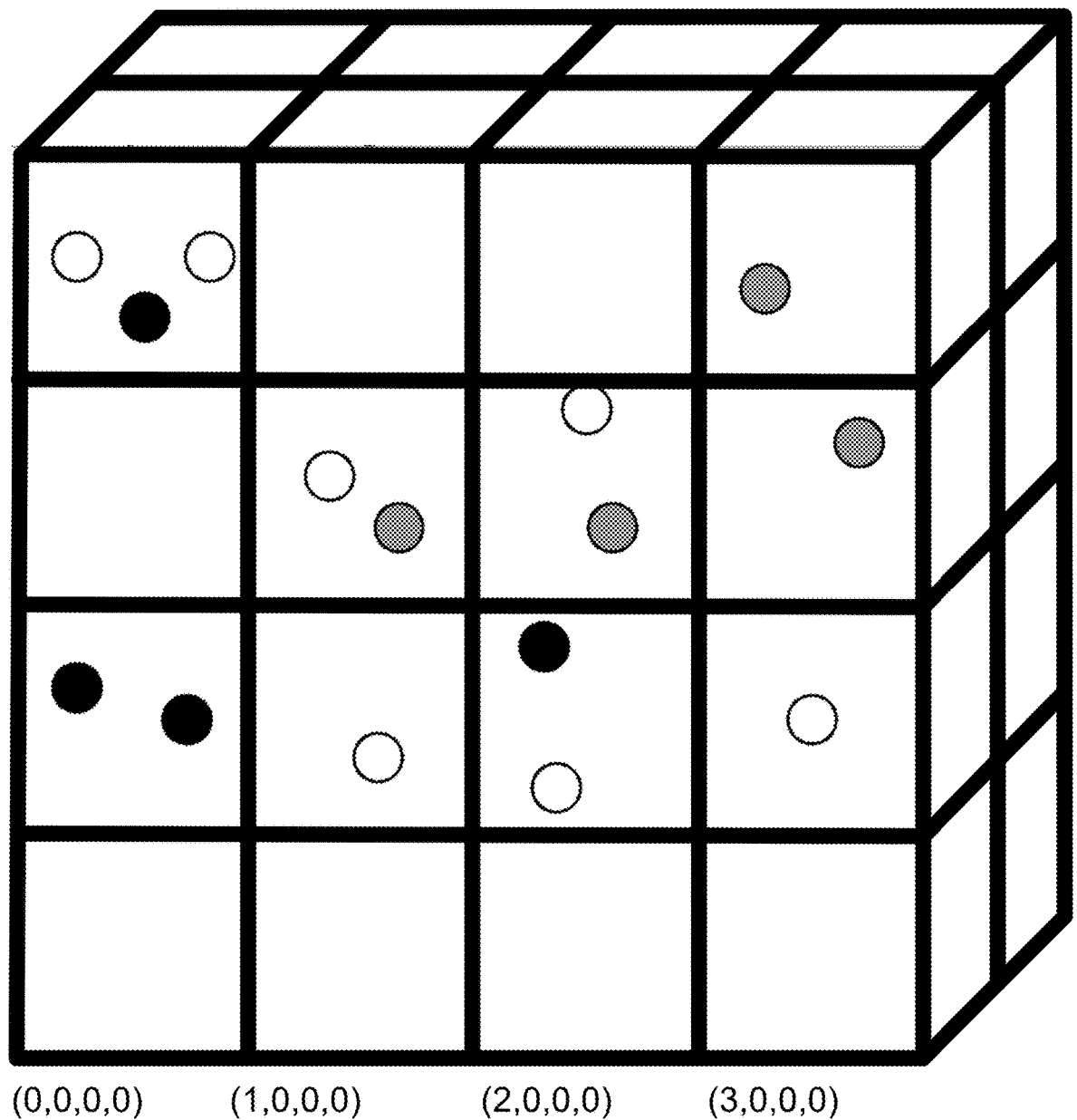
FIG. 8H shows an example diagram representing the portion of the point cloud with each octant shown in FIG. 8F subdivided into octants in accordance with some aspects of the disclosed subject matter.

FIG. 8H shows an example diagram representing the portion of the point cloud with each octant shown in FIG. 8F subdivided into octants in accordance with some aspects of the disclosed subject matter. As shown in FIG. 8H, in some aspects, each octant shown in FIGS. 8F and 8G can be further subdivided into octants (e.g., each of these octants are sometimes referred to as sub-octants). Each of these octants can then be subdivided into voxels, and used as the basis of another level of synthetic point cloud. As shown in FIG. 8H, in some aspects, each sub-octant can be addressed by an index number I, and each synthetic point in the synthetic point cloud representation based on voxels subdivided from the sub-octants can be addressed using four coordinates (I, X, Y, Z).

Figure 9:
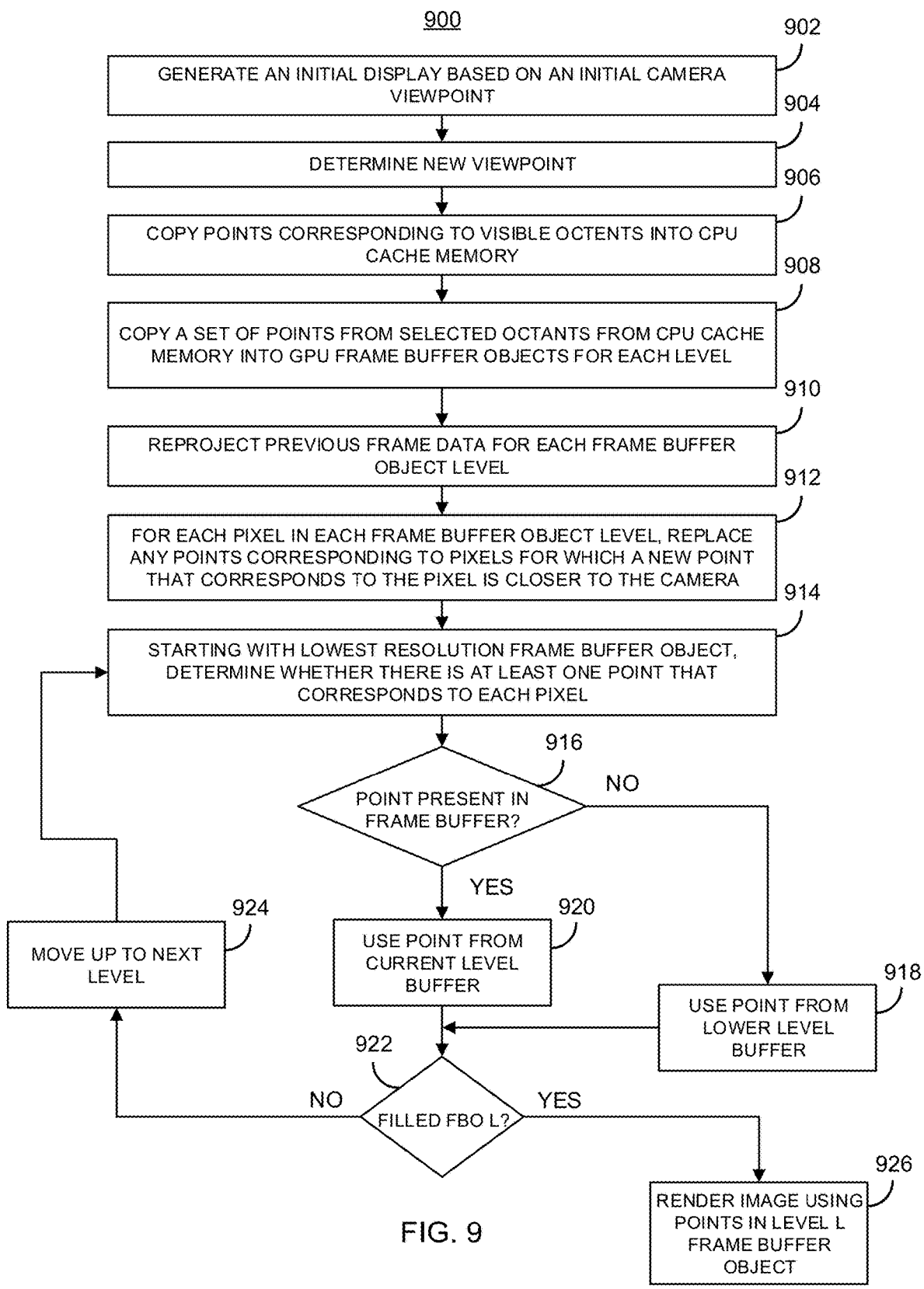
FIG. 9 shows an example of a process for hierarchical progressive point cloud rendering using synthetic point cloud data in accordance with some aspects of the disclosed subject matter.

FIG. 9 shows an example 900 of a process for hierarchical progressive point cloud rendering using synthetic point cloud data in accordance with some aspects of the disclosed subject matter. As shown in FIG. 9, process 900 can begin by generating an initial image to be displayed based on an initial virtual camera viewpoint. In some aspects, the initial virtual camera viewpoint can be predetermined, and the initial image to be displayed can be predetermined using known points from the point cloud. Alternatively, in some aspects, the initial camera angle may not be predetermined, and the initial image to be displayed can be generated using similar techniques to those described below in connection with 904-926.

At 904, process 900 can determine a new viewpoint of the virtual camera. In some aspects, such as when process 900 is used in connection with a head mounted display, the viewing angle changes by at least a small amount between most frames due to small, potentially involuntary, movements by the wearer and/or large voluntary movements. Process 900 can use any suitable technique or combination of techniques to determine the new viewpoint of the virtual camera.

In some aspects, process 900 can determine, for each synthetic point cloud, which octants of the synthetic point cloud intersect the viewing frustum of the virtual camera. In some aspects, process 900 can use any suitable technique or combination of techniques to determine which octant(s) of each synthetic point cloud intersects the viewing frustum. For example, in some aspects, process 900 can use view frustum culling to determine visible nodes in the octree, and nodes in each level of the octree can be mapped to octants in each synthetic point cloud. In such an example, process 900 can determine that a particular octant(s) in each synthetic point cloud are visible based on the corresponding node in the octree being visible.

At 906, process 900 can copy points corresponding to the visible octants from the point cloud data (e.g., in storage or memory) and synthetic points corresponding to the visible octants of each synthetic point cloud into the CPU cache memory. In some aspects, the CPU can determine which octant(s) are visible based on viewpoint information, and can copy the points corresponding to the visible octants (e.g., as determined at 904). Additionally, in some aspects, process 900 can copy some points that may fall outside the current viewing frustum of the virtual camera, as this can facilitate more quickly rendering points that were just off screen in the previous frame.

At 908, process 900 can copy points from the CPU cache (e.g., CPU cache 108) into a frame buffer object for each resolution level (e.g., from level 0 to level L in FIG. 6). In some aspects, process 900 can select a random visible octant from each synthetic point cloud to copy points from. For example, if the lowest resolution representation includes one volume representing the entire point cloud (e.g., level 0 in FIG. 6), process 900 can copy points from the lowest resolution point cloud without random selection. As another example, process 900 can randomly select a single octant from the highest resolution synthetic point cloud (e.g., level L), and can copy synthetic points from that octant into the corresponding frame buffer object.

As another example, process 900 can select visible octants based on an expected number of points per pixel represented by a particular octant if it were to be used to fill a portion of a particular resolution of frame buffer object. For example, for each octant that is in the viewing frustum, process 900 can determine how many cells map to each pixel in the frame buffer object if that octant were used to fill a portion of the frame buffer object. A more detailed example of selecting octants based on the projected points per pixel is described below in connection with FIGS. 10 and 11.

Note that, because each octant can include up to only a maximum number of points (e.g., $128^3$ points, $256^3$ points), process 900 can copy all points from the selected octant in some cases. Additionally or alternatively, in some aspects, octants which are particularly dense can be subsampled (e.g., rather than copying all points). For example, process 900 can copy points corresponding to every other voxel (or every third voxel, fourth voxel, etc.) of a particularly dense octant. In some aspects, process 900 can determine whether the number of points in a particular octant is greater than a threshold, and can subsample the lowest resolution point cloud by sampling, for example, one half of the point cloud that is farthest from the current camera position along a direction of view (e.g., to insure that many of the points will be within the viewing frustum, rather than behind the current camera position). In some aspects, any suitable number of points can be copied at 908, and in some cases the number can be adjustable (e.g., in settings associated with an application rendering the scene). In such aspects, if the number of points in a selected octant is greater than the set number of points to be copied, a subset of points can be selected At 910, process 900 can reuse the data that was included in the frame buffer object for each level used during rendering of the previous frame. For example, the points in the frame buffer object for each level can be copied to a second frame buffer object when the previous frame is rendered. In some aspects, process 900 can draw a screen-filling point grid with one point per pixel using the points from the previous frame, and the previous frame's render target buffer can be bound as a read texture and drawn to a second render target. For each point, the coordinates can be used as texture coordinates into the color texture. In some aspects, the frame buffers can have a first binding point for the geometry and color, and a second binding point for the depth. Note that, while frame buffers can have a 32 bit floating point format, the synthetic point cloud data can be organized similarly to octree data and stored in a binary format, with each point having a size of 6 bytes, three bytes for the 3D position (e.g., if each grid is subdivided into $256^3$ or less cells), and three bytes for a packed RGB color (in a depth first or breadth first order). In some aspects, an additional channel (e.g., the alphas channel "A" which is generally used to record transparency) can be used to record which level of synthetic point cloud the point originated from using an additional byte. As described above in connection with FIG. 5, a metadata file can hold an octree structure, and can include bounding box information that indicates which area of space is bounded by each octant. Note that the smaller size (e.g., six bytes compared to 16 bytes) can increase the speed with which the data can be accessed and/or the amount of points that can be held in memory. As described above in connection with FIG. 5, another metadata file can include information that can indicate where each octant begins in the binary file storing synthetic point cloud points. For example, in some aspects, each point in the lowest resolution point cloud can have a size of six bytes, three bytes for the position in the grid of voxels (e.g., with the coordinates (0,0,0) representing a particular corner of the point cloud), and three bytes for a packed RGB color.

At 912, for each frame buffer object, process 900 can determine for each pixel whether a point copied from the CPU is closer to the camera than the point that was rendered in the previous frame (and/or whether one point rendered in the previous frame represents the same pixel and is closer to the camera than another point rendered in the previous frame due to a change in viewing angle). For example, at each resolution, process 900 can determine whether, for a particular pixel, one of the points copied from the CPU is closer than the point used to render that pixel in the previous frame. In some aspects, process 900 can overwrite (or otherwise replace) the point for that pixel from the previous frame with the new points that are closer to the camera.

At 914, process 900 can determine, for each pixel of the lowest resolution frame buffer, whether a point in the frame buffer corresponds to that pixel. If there is a pixel that does not have a corresponding point ("NO" at 916), process 900 can move to 918 at which process 900 can use a point from a lower resolution frame buffer. In some aspects, if the current frame buffer object is the lowest resolution frame buffer object, process 900 can use any suitable value (e.g., color and/or distance) to provide a value for the pixel.

Otherwise, if there is a point corresponding to a pixel in a frame buffer object for the current level ("YES" at 916), process 900 can move to 920, at which process 900 can keep the point currently in the frame buffer object.

At 922, process 900 can determine whether the highest resolution frame buffer object (e.g., the frame buffer object that is filled using points copied from the point cloud, rather than points from a synthetic point cloud). If process 900 determines that the highest resolution frame buffer object has not been filled ("NO" at 922), process 900 can move to 924. At 924, process 900 can move to the next highest resolution frame buffer object and can return to 914. At which process 900 can again begin determining, using points copied from the next highest resolution representation of the point cloud (e.g., the synthetic point cloud organized into eight octants each having up to $n^3$ points).

Otherwise, if process 900 determines that the highest resolution frame buffer object has been filled ("YES" at 922), process 900 can move to 926. At 926, process 900 can render an image using points from the highest resolution frame buffer object. In some aspects, an additional transformation can be included in the pipeline, such that the fragment position p can be represented as:

$$p=[1-W,1-W,1,1]^t \cdot P \cdot MV \cdot v, \quad (1)$$

where MV is the modelview matrix, P is the projection matrix, and W is the percentage of view which is to be extended. Additionally, in some aspects, process 900 can look up color information for each point, taking into account that data may have been rendered off screen via the W value from EQ. 1. For example, a geometry shader can narrow the default (0-1) texture coordinates to (W'-W'') used for lookup via the following:

$$W'=((1.0-W)*0.5), \quad (2)$$

$$W''=1.0-W', \quad (3)$$

In some aspects, throughout the pipeline, point color can be packed into the alpha component of the floating point geometry buffer. Accordingly, as a final step, each pixel's final color can be unpacked from the geometry buffer's alpha component and rendered to screen.

Figure 10:
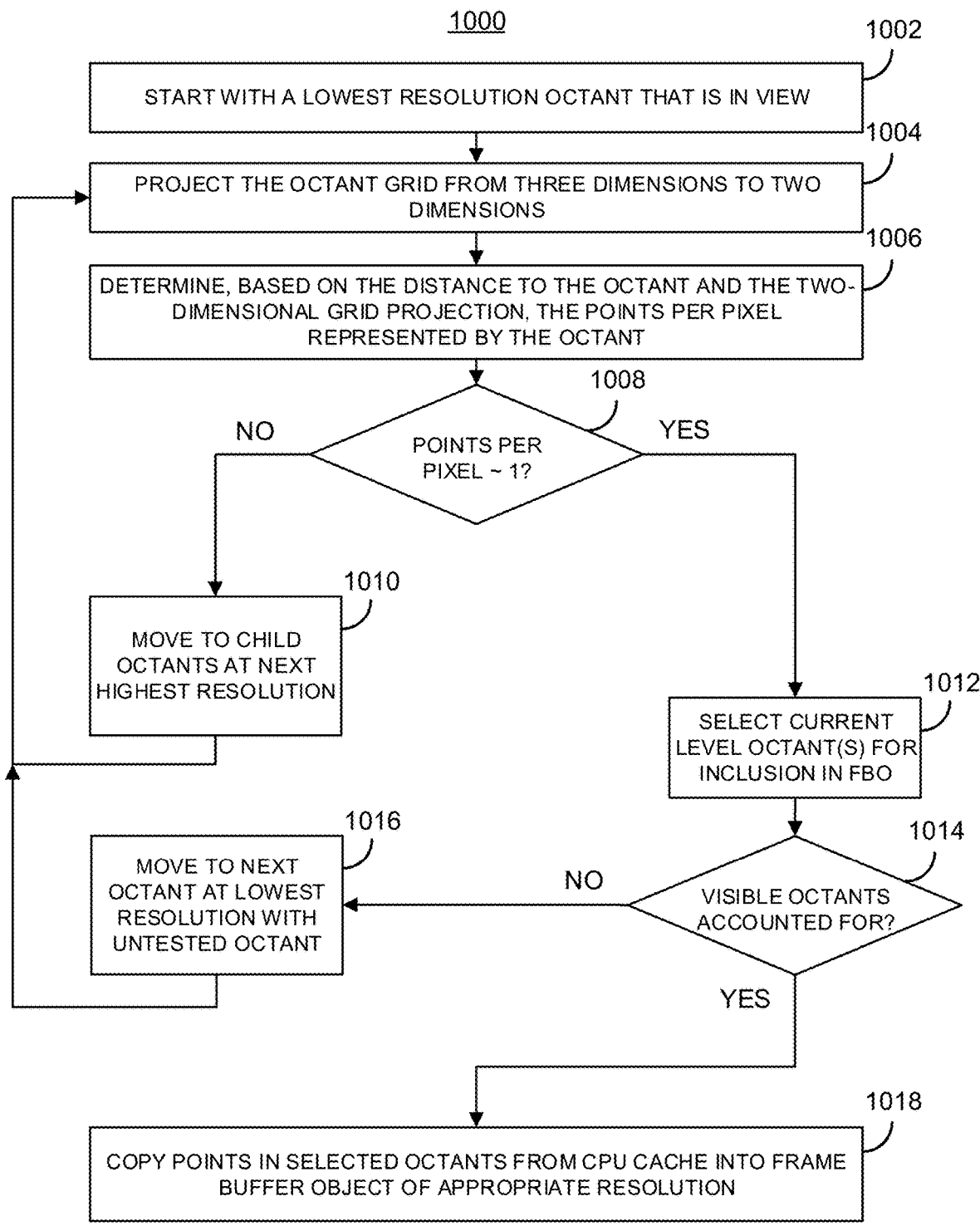
FIG. 10 shows an example of a process for selecting octants from which copy points at each resolution of frame buffer in accordance with some aspects of the disclosed subject matter.

FIG. 10 shows an example 1000 of a process for selecting octants from which copy points at each resolution of frame buffer in accordance with some aspects of the disclosed subject matter. As shown in FIG. 10, at 1002, for a particular resolution frame buffer object, process 1000 can start with a lowest resolution octant that is in the viewing frustum. For example, process 1000 can start with the octant at level 0 in FIG. 6 that represents the entire point cloud (as this octant always overlaps the viewing frustum by definition). Alternatively, in some aspect, process 1000 can start at a lowest resolution octant that represents a portion of the point cloud (e.g., an octant in level 1).

At 1004, process 1000 can project the grid of the octant being evaluated from three dimensions to two dimensions on a plane parallel to a plane represented by the frame buffer object. For example, based on the orientation of the octant with respect to the viewing frustum, process 1000 can determine how many exterior voxels of the octant are visible. In such an example, if the octant is aligned with the viewing frustum, the number of visible voxels can be about the amount of voxels on a single face of the octant (e.g., $n^2$ voxels), whereas if the octant is at an angle to the viewing frustum, more voxels may be visible (e.g., portions of multiple faces of the octant may be exposed to the viewing frustum).

At 1006, process 1000 can determine, based on a distance to the octant, and the two-dimensional projection of the grid, the number of points that would correspond to each pixel at the plane represented by the frame buffer object. For example, as the distance to an octant increases, the number of points that correspond to each pixel also increases as the same number of points occupy a smaller portion of the field of view. Further examples of determining the number of points per pixel are described below in connection with FIGS. 11A to 11C.

If process 1000 determines that the octant does not represent about one point per pixel ("NO" at 1008), process 1000 can move on to child octants of the current octant at the next highest resolution (if such child octants exist) at 1010. For example, if the number of points per pixel is greater than one, process 1000 can move to child octants representing the same portion of the scene that have, for example, twice the spatial resolution along each direction (e.g., the same number of grid cells representing half of the space in each direction). Process 1000 can move back to 1004 to begin determining whether the child octant(s) represent about one point per pixel. In some aspects, process 1000 can determine whether the points per pixel is roughly equal to one based on a threshold. For example, process 1000 can determine whether the points per pixel of the octant is less than (or less than or equal to) a threshold (e.g., 1.05, 1.1, 1.2, 1.3, etc.). In some aspects, a higher threshold (e.g., farther above one) can result in the image being rendered with a lower average resolution than if a lower threshold (e.g., closer to one) were used, and can also result in fewer points being copied from cache (e.g., because lower resolution octants representing a relatively large volume using up to $n^3$ points are more likely to be selected with a higher threshold, rather than selecting multiple octants each representing ⅛ of the volume represented by the larger volume using up to $n^3$ points).

Otherwise, if process 1000 determines that the octant represents about one point per pixel ("YES" at 1008), process 1000 can move to 1012 to select the current level octant(s) for inclusion in the current level frame buffer object.

At 1014, process 1000 can determine whether all visible octants have been account for by determining which points to copy based on which octants represent a one point per pixel resolution. If process 1000 determines that each visible octant has not been accounted for ("NO" at 1014), process 1000 can move on to a next octant at the lowest resolution which has an octant that has not yet been analyzed. For example, if the analysis started with an octant representing the entire point cloud, process 1000 can move on to a child of that octant (rather than returning to that octant).

Otherwise, if process 1000 determines that each visible octant has been accounted for ("YES" at 1014), process 1000 can copy points in the selected octants from CPU cache into a frame buffer object of the resolution being analyzed. Note that, because each frame buffer object corresponds to a different resolution, an octant that projects to one point per pixel for a first frame buffer object may project to two points per pixel for a higher resolution frame buffer object.

FIGS. 11A to 11C show examples of the same octant at different distances corresponding to different points per pixel in accordance with some aspects of the disclosed subject matter. As shown in FIG. 11A, the octant projects to about two points per pixel when projected back to the plane represented by the frame buffer object. Accordingly, a lower resolution octant representing the same portion of the scene would be closer to one point per pixel. As shown in FIG. 11B, when the camera is closer to the octant, the octant projects to about one point per pixel, and the octant is selected for use with that frame buffer object. As shown in FIG. 11C, when the camera is yet closer to the octant, the octant projects to about one-half point per pixel, and a higher resolution octant representing the same portion of the scene would be closer to one point per pixel. Note that only a single pixel is represented in FIGS. 11A to 11C. As can be appreciated from FIGS. 11A to 11C, as the camera moves closer to a portion of the scene, higher resolution representations of the scene can be used to render the images presented to user with a lower risk of underdrawing (e.g., leaving gaps) or overdrawing points (e.g., copying excess points that end up being discarded). By contrast, randomly selecting octants can result in overdrawing points, which can in some cases reduce the frame rate that can be achieved due to the presence of more points that are not rendered. Additionally, points in the scene that are relatively close can be represented in more detail by using points from the higher resolution representations of the point cloud (i.e., by selecting higher resolution octants for those portions of the scene), while points in the scene that are relatively far can be represented in less detail (i.e., by selecting lower resolution octants). Note that although only a single octant is shown to avoid overcomplicating the illustration, there can be other visible octants (e.g., closer to or farther from the pixel plane), and the mechanisms described herein can select which resolution of octant(s) to use to represent those spaces.

Note that, although the mechanisms described herein are generally described in connection with rendering a single image, this is merely an example, and in some aspects, two images can be rendered in parallel from two different viewpoints to facilitate presentation of a stereoscopic pair of images. For example, a GPU associated with a head mounted display can render two images in parallel using techniques described herein. In such an example, the visible octants for each image in the stereoscopic pair are generally the same, but in some cases a portion of an octant may be visible in one image, but not in the other.

In some aspects, any suitable computer readable media can be used for storing instructions for performing the functions and/or processes described herein. For example, in some aspects, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 3 and 9 can be executed or performed in any order or sequence not limited to the order and sequence shown and described in the figures. Also, some of the above steps of the processes of FIGS. 3, 7, and 9 can be executed or performed substantially simultaneously where appropriate or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by the claims that follow. Features of the disclosed aspects can be combined and rearranged in various ways.

What is claimed is:

1. A method for point cloud rendering, comprising:
rendering a first image based at least in part on point cloud data, the first image corresponding to a first viewing frustum;
determining that a viewing angle has changed to a second viewing frustum;
receiving, from a memory, points within the second viewing frustum;
reprojecting points used during rendering of the first image into a plurality of frame buffer objects of different resolutions including at least a first frame buffer object of a first resolution, and a second frame buffer object of a second resolution, wherein the second resolution is higher than the first resolution;
determining, for each frame buffer object, whether at least one point received from the memory corresponds to the same position in the frame buffer object as a point reprojected into the frame buffer object;
overwriting, in each frame buffer object, at least one reprojected point with a point corresponding to the same position received from the memory that is closer to a camera position;
determining that a first position in the first frame buffer object is not associated with a reprojected point and is not associated with a point received from the memory after rendering of the first image;
subsequent to determining that the first position in the first frame buffer object is not associated with a reprojected point and not associated with a new point, copying a point that originated in a lower resolution frame buffer object to the first position of the first frame buffer object;
determining that the second frame buffer object is filled; and
in response to determining that the second frame buffer object is filled, rendering a second image based on the contents of the second frame buffer object.

2. The method of claim 1, further comprising:
determining that a first octant of the plurality of octants intersects the second viewing frustum.

3. The method of claim 1, wherein the memory comprises central processing unit (CPU) cache memory, and
wherein the method further comprises:
copying points corresponding to one or more octants that intersect the second viewing frustum into the CPU cache memory.

4. The method of claim 3, wherein receiving points within the second viewing frustum comprises:
randomly selecting a plurality of points from the CPU cache memory;
associating a first subset of the plurality of points with the first frame buffer object; and
associating a second subset of the plurality of points with the second frame buffer object.

5. The method of claim 4, wherein the first subset includes about half as many points as the second subset.

6. The method of claim 3, wherein receiving points within the second viewing frustum comprises:
receiving points from a first synthetic point cloud that are within the second viewing frustum, wherein the first synthetic point cloud has a resolution that is lower than a resolution of the point cloud data;
associating a subset of the points from the first synthetic point cloud with the first frame buffer object;
receiving points from a second synthetic point cloud that are within the second viewing frustum, wherein the second synthetic point cloud has a resolution that is lower than a resolution of the point cloud data and higher than a resolution of the first synthetic point cloud; and
associating a subset of the points from the second synthetic point cloud with the second frame buffer object.

7. The method of claim 1, further comprising:
determining that a second position in the first frame buffer object is not associated with a reprojected point and is not associated with a point received from the memory after rendering of the first image;
in response to determining that the second position in the first frame buffer object is not associated with a reprojected point and not associated with a new point, determining a number of pixels neighboring the second position in the first frame buffer object that are filled;
determining that the number of pixels neighboring the second position in the first frame buffer object that are filled satisfies a threshold;
in response to determining that the number of pixels neighboring the second position in the first frame buffer object that are filled satisfies the threshold, interpolating a point for the second position based on points associated with the pixels neighboring the second position; and
store the interpolated point at the second position in the first frame buffer object.

8. The method of claim 1, further comprising:
in response to determining that the first position in the first frame buffer object is not associated with a reprojected point and not associated with a new point, determining a number of pixels neighboring the first position in the first frame buffer object that are filled;
determining that the number of pixels neighboring the first position in the first frame buffer object that are filled fails to satisfy a threshold; and
in response to determining that the number of pixels neighboring the first position in the first frame buffer object that are filled fails to satisfy the threshold, copying the point that originated in the lower resolution frame buffer object to the first position of the first frame buffer object.

9. The method of claim 1, wherein the point cloud data is organized as an octree structure with a plurality of levels.

10. The method of claim 1, wherein the point cloud data is organized as a plurality of synthetic point clouds having various resolutions.

11. The method of claim 1, further comprising:
selecting a first subdivision of the point cloud data based on a distance to the first subdivision and a two-dimensional projection of points in the first subdivision; and
requesting, from the memory, points in the first subdivision based on the selection.

12. A method for point cloud rendering, comprising:
rendering a first image based at least in part on point cloud data, the first image corresponding to a first viewing frustum,
wherein the point cloud data is organized using a plurality of levels including a root level and one or more child levels,
a first child level of the plurality of child levels is organized using a plurality of subdivisions that each represent ⅛ of the root level, and
a second child level of the plurality of child levels is organized using a plurality of subdivisions that each represent less than ⅛ of the root level;
determining that a viewing angle has changed to a second viewing frustum;
identifying a first subdivision of the first child level intersects the second viewing frustum;
identifying a second subdivision of the second child level that intersects the second viewing frustum;
determining that a number of points in a two-dimensional projection of the second subdivision corresponding to each pixel at a plane represented by a frame buffer object is about equal to one;
associating points from the second subdivision with the frame buffer object; and
rendering a second image corresponding to a second viewing frustum based at least in part on the points associated with the frame buffer object.

13. The method of claim 12, further comprising:
projecting points in the second subdivision into two dimensions thereby generating a two-dimensional projection of the second subdivision;
determining a distance to the second subdivision;
determining that the number of points in the two-dimensional projection of the first subdivision corresponding to each pixel at the plane represented by the frame buffer object is about one based on the two-dimensional projection of the second subdivision and the distance to the second subdivision; and
selecting the second subdivision for association with the frame buffer object.

14. The method of claim 12, further comprising:
projecting points in the first subdivision into two dimensions thereby generating a two-dimensional projection of the first subdivision;
determining a distance to the first subdivision;
determining, based on the two-dimensional projection of the first subdivision and the distance to the first subdivision, that a number of points in the two-dimensional projection of the first subdivision corresponding to each pixel at a plane represented by a frame buffer object is greater than one; and
inhibiting the first subdivision from being associated with the frame buffer object.

15. The method of claim 12, further comprising:
identifying a third subdivision of the third child level that intersects the second viewing frustum;
determining that a number of points in a two-dimensional projection of the second subdivision corresponding to each pixel at a plane represented by a second frame buffer object is greater than one;
determining that a number of points in a two-dimensional projection of the third subdivision corresponding to each pixel at the plane represented by the second frame buffer object is about equal to one;
associating points from the third subdivision with the second frame buffer; and
rendering the second image based at least in part on the points associated with the second frame buffer.

16. The method of claim 12, further comprising:
reprojecting points used during rendering of the first image into a plurality of frame buffer objects of different resolutions including at least the frame buffer object of a first resolution, and a second frame buffer object of a second resolution, wherein the second resolution is higher than the first resolution;
receiving, from a memory, points from the second subdivision;
determining, for at least the frame buffer object, whether at least one point received from the memory corresponds to the same position in the frame buffer object as a point reprojected into the frame buffer object;
overwriting at least one reprojected point with a point corresponding to the same position received from the memory that is closer to a camera position;
rendering the second image based on the contents of the second frame buffer object.

17. A system method for point cloud rendering, comprising:
memory storing point cloud data representing a three dimensional scene, the point cloud data organized into a hierarchical data structure;
a central processing unit (CPU) associated with CPU cache memory; and
a graphic processing unit (GPU), wherein the GPU is programmed to:
render a first image based at least in part on point cloud data, the first image corresponding to a first viewing frustum;
determine that a viewing angle has changed to a second viewing frustum;
receive, from the CPU cache memory, points within the second viewing frustum;
reproject points used during rendering of the first image into a plurality of frame buffer objects of different resolutions including at least a first frame buffer object of a first resolution, and a second frame buffer object of a second resolution, wherein the second resolution is higher than the first resolution;
determine, for each frame buffer object, whether at least one point received from the memory corresponds to the same position in the frame buffer object as a point reprojected into the frame buffer object;
overwrite, in each frame buffer object, at least one reprojected point with a point corresponding to the same position received from the memory that is closer to a camera position;
determine that a first position in the first frame buffer object is not associated with a reprojected point and is not associated with a point received from the memory after rendering of the first image;
subsequent to determining that the first position in the first frame buffer object is not associated with a reprojected point and not associated with a new point, copy a point that originated in a lower resolution frame buffer object to the first position of the first frame buffer object;
determine that the second frame buffer object is filled; and
in response to determining that the second frame buffer object is filled, render a second image based on the contents of the second frame buffer object.

18. The system of claim 17, wherein the point cloud data is organized using an octree data structure.

19. The system of claim 17, wherein the point cloud data is organized using a plurality of synthetic point clouds having various resolutions.

* * * * *